(12) United States Patent
Bolis

(10) Patent No.: US 8,072,689 B2
(45) Date of Patent: *Dec. 6, 2011

(54) OPTICAL DEVICE WITH MEANS OF ACTUATING A COMPACT DEFORMABLE MEMBRANE

(75) Inventor: Sebastien Bolis, Crolles (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/669,266

(22) PCT Filed: Jul. 17, 2008

(86) PCT No.: PCT/EP2008/059385
§ 371 (c)(1), (2), (4) Date: Jan. 15, 2010

(87) PCT Pub. No.: WO2009/010559
PCT Pub. Date: Jan. 22, 2009

(65) Prior Publication Data
US 2010/0182703 A1    Jul. 22, 2010

(30) Foreign Application Priority Data
Jul. 19, 2007 (FR) ...................................... 07 56618

(51) Int. Cl.
*G02B 3/12* (2006.01)
(52) U.S. Cl. ........................................ 359/665; 359/666
(58) Field of Classification Search ........... 359/665–667
See application file for complete search history.

(56) References Cited

U.S. PATENT DOCUMENTS

| | | | |
|---|---|---|---|
| 4,226,507 A | 10/1980 | Fuschetto | |
| 5,138,494 A | 8/1992 | Kurtin | |
| 5,917,657 A | 6/1999 | Kaneko et al. | |
| 6,344,930 B1 | 2/2002 | Kaneko et al. | |
| 7,755,840 B2 * | 7/2010 | Batchko et al. | 359/665 |
| 2010/0118413 A1* | 5/2010 | Kim et al. | 359/666 |
| 2010/0276493 A1* | 11/2010 | Havens et al. | 235/470 |

FOREIGN PATENT DOCUMENTS

| | | |
|---|---|---|
| JP | 10-144975 | 5/1998 |
| WO | WO 03/102636 A1 | 12/2003 |
| WO | WO 2007/017089 A1 | 2/2007 |

OTHER PUBLICATIONS

U.S. Appl. No. 12/610,719, filed Nov. 2, 2009, Bolis.
U.S. Appl. No. 12/669,323, filed Jan. 15, 2010, Bolis.

* cited by examiner

*Primary Examiner* — Darryl J Collins
(74) *Attorney, Agent, or Firm* — Oblon, Spivak, McClelland, Maier & Neustadt, L.L.P.

(57) ABSTRACT

An optical device with a deformable membrane including an anchoring area on a support helping to contain a constant volume of liquid in contact with one of its faces, a substantially central area, configured to be deformed reversibly from a rest position, and an actuation mechanism displacing the liquid in the central area, stressing the membrane in parts situated between the central area and the anchoring area. The actuation mechanism includes plural thermal or piezoelectric actuators of micro-beam type, distributed at the periphery of the membrane, the micro-beams including at least one fixed part joined to the support and at least one moving part coming into contact, on an actuation, with the membrane in an area situated between the central area and the anchoring area.

38 Claims, 24 Drawing Sheets

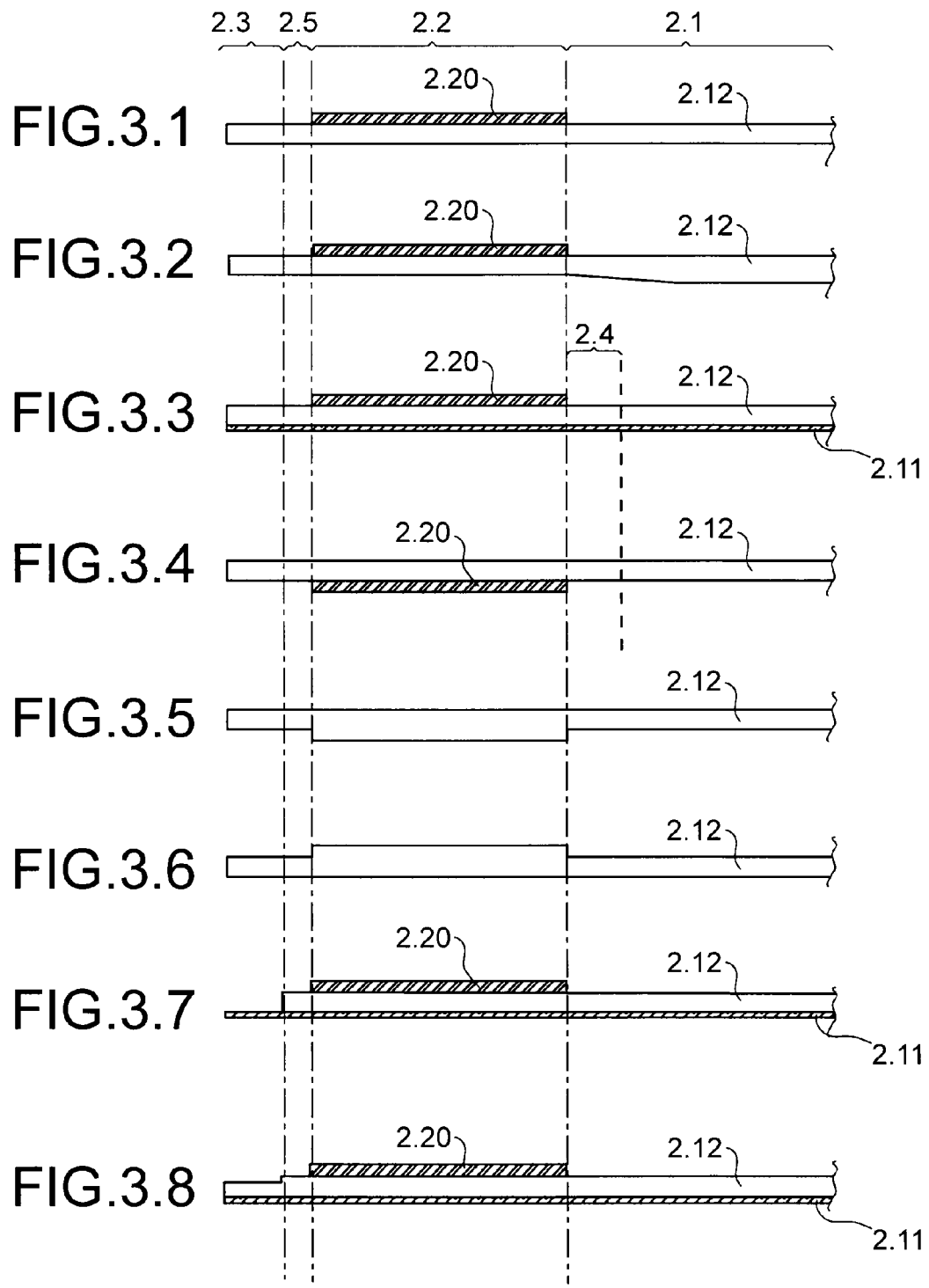

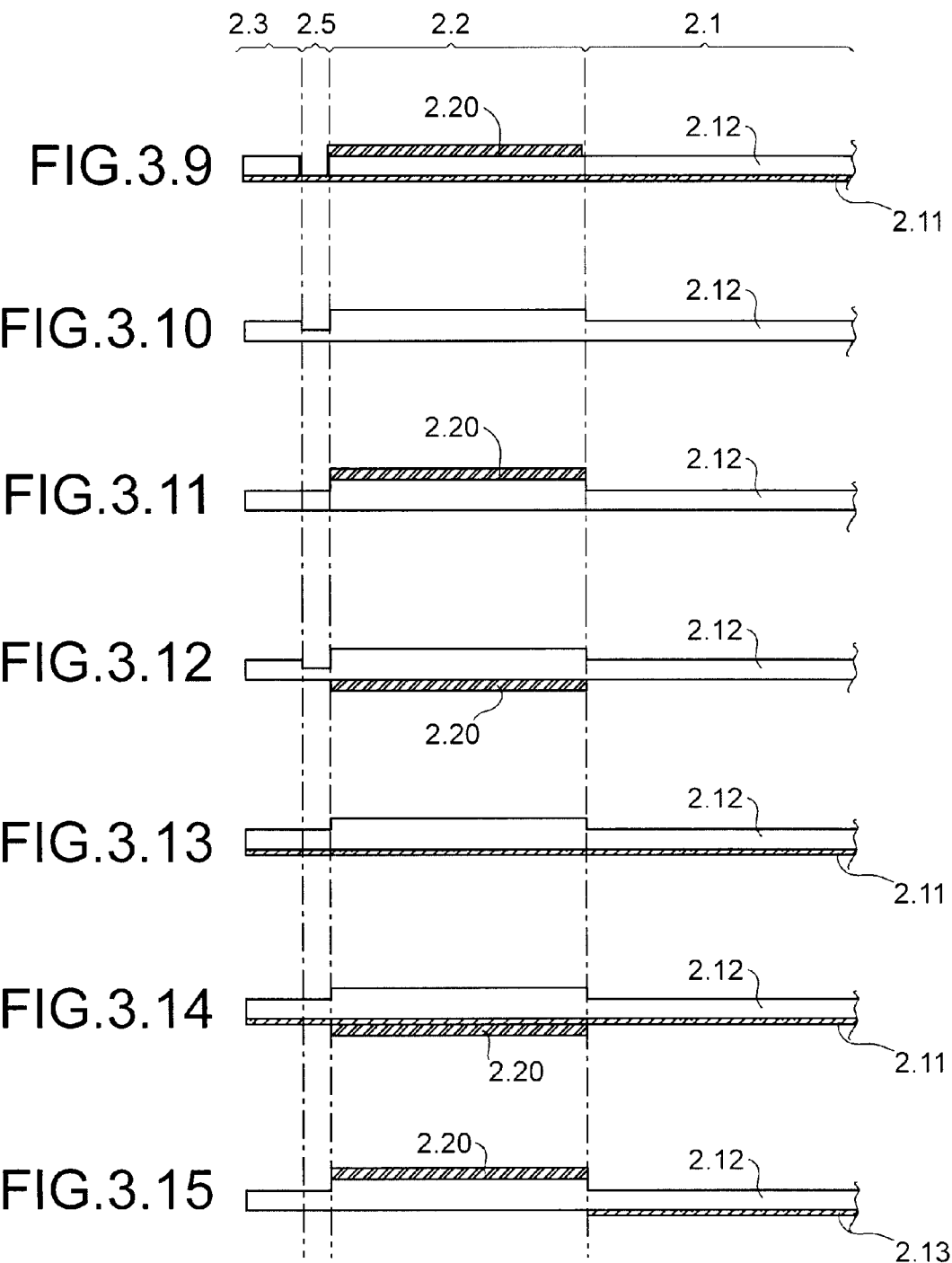

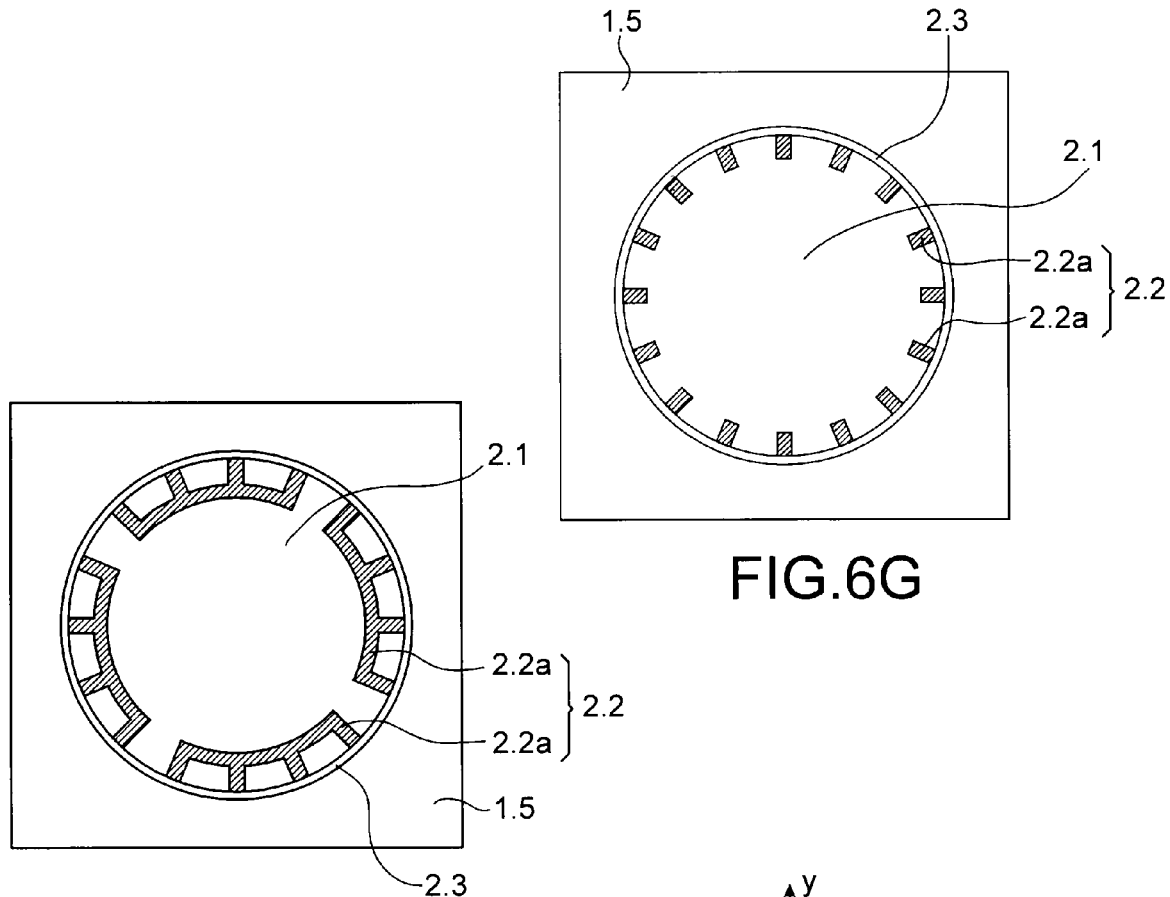
FIG.6G
FIG.6H
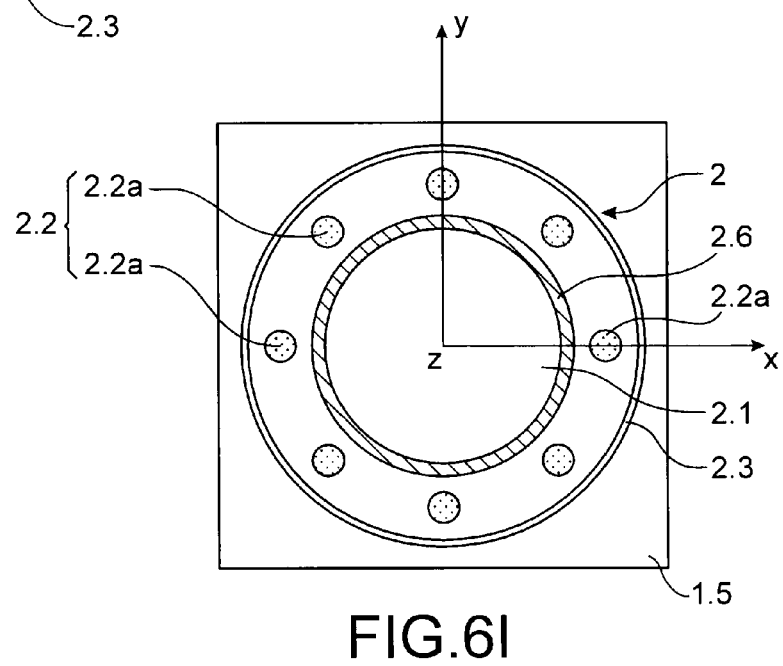
FIG.6I

OPTICAL DEVICE WITH MEANS OF ACTUATING A COMPACT DEFORMABLE MEMBRANE

TECHNICAL FIELD

The present invention relates to an optical device with deformable membrane such as a variable focal distance liquid lens, a liquid lens with correction of optical aberrations in adaptive optics or even a membrane deformable mirror.

Among all the types of variable focal distance liquid lenses, there exists one formed of an optical liquid working at constant volume between walls, at least one of which may be displaced. Optical liquid is taken to mean a liquid that has optical properties appropriate to the refraction of light and which has an index greater than 1, typically 1.4 or 1.5. Hereafter, the term liquid will simply be used. However, lenses of this type are hardly used in miniature cameras such as those integrated in camera-telephones because the mechanical structures for varying their focal distance are complex, they penalise the size, the cost and the reliability of these lenses.

These miniature cameras, working in the visible, are known as CCM (compact camera modules). Said CCM are instead provided with lenses comprising one or two liquids to which a voltage is applied in order to modify their wettability.

Nevertheless, numerous developments are underway, including in particular the autofocus function and the zoom function. The aim in introducing these functions is to obtain as short a response time as possible. More generally, the aim is to integrate the constituents of these CCM as much as possible in order to reduce the costs, size and energy consumption.

Another application concerns cameras operating in the infrared (IR). The progress in terms of integration is less, in most cases the optics are dissociated from the cameras. Several developments are underway, including in particular the integration of optics (creation of a camera module), the integration of the autofocus function, etc. For the moment, the associated technical solutions are not known and need to be defined.

In a membrane deformable mirror application, the latter is reflecting. It may be that it is wished to adjust the focal distance of the mirror and thus its radius of curvature. Such a mirror may be used in opthalmology or in adaptive optics.

STATE OF THE PRIOR ART

Optical devices with variable focal distance such as variable focal distance liquid lenses comprising a liquid working at constant volume between two walls, at least one of which is movable, have been the object of several patents, for example: U.S. Pat. Nos. 5,917,657, 6,344,930, JP-A-10-144975, JP-A-08-114 703, U.S. Pat. No. 5,138,494, WO 2003/102636, JP2002-243918 and JP-A-60 220301.

None of these patents mentions an application for a portable telephone camera, but instead for telescopes, optical microscopes and digital cameras for example. In fact, the mechanical structures associated with the membranes are all very complex and are much too expensive for this type of application.

FIGS. 15A, 15B show two examples of variable focal distance liquid lenses, described in U.S. Pat. No. 5,917,657. These lenses are chosen because they illustrate the least complex lenses.

The liquid lens 1000 of FIG. 15A comprises a first central transparent elastic film 106a, a second central transparent elastic film 106b, a peripheral elastic film 104 and a peripheral container 105. The first and second transparent elastic films 106a, 106b are placed opposite to each other. The peripheral elastic film 104 is fixed around the first transparent elastic film 106a and the whole forms a first membrane. The first membrane is anchored on one face of the peripheral container 105. The second membrane comprises the second elastic film. It is anchored on another face of the peripheral container. All of these elements are hermetically sealed together and contain a liquid 103. The actuation means of the lens 102, the function of which is to exercise a pressure on the liquid 103, act in the peripheral elastic film 104. They comprise several actuators 201 arranged in a crown shaped container 203. Said container is relatively thick. Their action takes place on the membrane via a ring transferred onto the peripheral elastic film 104. The two containers 105, 203 are assembled face to face. The transparent elastic films only have an optical role and the peripheral elastic film only has a mechanical role.

These liquid lenses 1000 have drawbacks that will be listed below.

An important drawback is linked to the type of actuation, which is bulky and complex, particularly due to the container.

The methods for producing these lenses are unitary and multidisciplinary. Said methods include techniques stemming from plastics processing to elaborate and shape the films, injection and machining techniques for forming the containers. The methods for hermetically assembling films to the container are different, depending on the nature of the sealing (plastic-plastic, plastic-glass, plastic-metal). In addition, the sealings to be carried out are not all situated in a same plane, which leads to awkward manipulations of films or plates, considerably complicating the method employed and the necessary tooling. These techniques are not compatible with the conventional batch production methods employed to make microelectromechanical systems MEMS or microoptoelectromechanical system MOEMS. Consequently, their cost remains high, as does their size.

In addition, it is difficult to position the transparent elastic film on the peripheral elastic film during the assembly and to position the ring perfectly during its transfer onto the peripheral elastic film. Another difficulty is positioning the actuators perfectly in relation to the ring. If the positioning is not perfect, optical aberrations result, which degrade the quality of the image obtained.

Moreover, it is necessary that the peripheral elastic film that is going to be displaced by the actuation means, whether at rest or in operation, is as parallel as possible in relation to the surface of the peripheral container at the level of the anchoring. If not, optical aberrations arise and they degrade the quality of the image obtained. Indeed, in FIG. 15B, the liquid lens described in U.S. Pat. No. 5,917,657 is represented in cross section with the exception of the actuation means. To avoid any risk of optical aberration, the principal planes in which the portions of membrane extend at the level of the sealing to the container and the sealing between the different films constituting the membrane must be substantially parallel. It is very difficult to obtain these results with the recommended multiple sealings.

Furthermore, since several films are hermetically sealed together, in the manner of a patchwork, and to the container to encapsulate the liquid, the risk of leaks is not negligible.

DESCRIPTION OF THE INVENTION

The present invention has precisely the aim of providing an optical device with deformable membrane such as a liquid lens or a mirror that does not have the above mentioned drawbacks, namely the complexity of the actuation means and their size, optical aberrations, the high risk of leaks, the incompatibility with the micro-electronic environment, the impossibility of being produced in batches.

To achieve this aim, the present invention proposes that the actuation means comprise several thermal or piezoelectric actuators of micro-beam type distributed at the periphery of the membrane, which is simple and reduces the size of the actuation means in a very significant manner.

Micro-beam is taken to mean an object in which the characteristic dimensions of its section, in other words its thickness and its width, are less than its length. A factor of at least two and ideally greater than five exists between the length and the characteristic dimensions of the section. The orders of magnitude of length are between several tens of micrometers and several millimeters.

More specifically, the present invention is an optical device with deformable membrane comprising an anchoring area on a support helping to contain a constant volume of liquid in contact with one of its faces, a substantially central area, able to be deformed reversibly from a rest position, actuation means for displacing the liquid in the central area, stressing the membrane in parts situated between the central area and the anchoring area. The actuation means comprise several thermal or piezoelectric actuators of micro-beam type, distributed at the periphery of the membrane, said micro-beams having at least one fixed part joined to the support and at least one moving part coming into contact, on an actuation, with the membrane in an area situated between the central area and the anchoring area.

The moving part may be without contact with the stressed part of the membrane in rest position.

In an alternative, the moving part may be in contact with the stressed part of the membrane at rest position and even if necessary joined to the stressed part.

The micro-beam type actuators may be joined to the support in an indirect manner.

The micro-beam type actuators may be joined to the support by means of the membrane in the anchoring area.

In an alternative, the micro-beam type actuators may be joined to the support beyond the membrane.

The micro-beam type actuators may be in contact with the liquid or without contact with the liquid.

It may be advantageous, particularly with regard to the size, that the membrane is integrated in the micro-beam type actuators.

With the same aim, the micro-beam type actuators may be inserted between two layers of the membrane. The size of the actuation means is reduced to the minimum.

The micro-beams may be rectilinear or curved, the latter case making it possible to reduce the surface of the support while increasing the length of the micro-beam. This alternative is also favourable to the reduction of the size.

At rest position, the membrane may be concave, convex or substantially flat.

The membrane comprises at least one continuous layer occupying the whole surface of the membrane, the risks of leaks are thus reduced.

To make the actuation of the membrane as uniform as possible, provision may be made so that the stressed parts are included in a reinforced area of the membrane, situated between the central area and the anchoring area, surrounding the central area, said reinforced area having a rigidity greater than that of the central area and that of the anchoring area.

The reinforced area may extend up to the central area without encroaching upon it or stop before the central area.

In the same way, the reinforced area may extend up to the anchoring area without encroaching upon it or stop before the anchoring area.

The reinforced area may be formed of the thickened continuous layer.

In an alternative, the reinforced area may be formed of a stack of at least the continuous layer and an additional layer.

The anchoring area may be formed of at least the continuous layer, if necessary thinned.

An intermediate guard area may be laid out between the anchoring area and the reinforced area and/or between the reinforced area and the central area, said intermediate guard area being formed of at least the continuous layer, if necessary thinned.

The reinforced area may be in a single part or split up into several portions.

The surface area of a stressed part is less than that of the reinforced area if it comprises a single part or that of a reinforced portion if it is split up.

The reinforced portions may each surround the central area or instead all of the reinforced portions may surround the central area.

The reinforced portions may be substantially circular, crown shaped, polygonal, crescent portions, radial strips.

When the reinforced portions form a discontinuous crown around the central area, the membrane may further comprise a continuous reinforcement area surrounding the central area, said reinforcement area being more rigid than the reinforced portions, and being situated between the central area and the reinforced portions.

The reinforced area may be a crown or a plurality of portions of crown provided with radial fingers projecting towards the central area or towards the anchoring area.

The support may be substantially flat or have a dish to accommodate the liquid.

The support may comprise two substrates assembled together, the membrane being joined to one of the substrates, the micro-beam type actuators being joined to the other substrate.

The support may comprise a frame and a second membrane anchored on the frame.

The support may comprise a frame and a transparent plate fixed to the frame helping to form a dish for the liquid, the transparent plate having substantially flat and parallel faces or a face external to the dish substantially concave or a face external to the dish substantially convex.

Capacitive means for measuring the thickness of the liquid may be provided for in at least one stressed part.

Means for automatically controlling the actuation means as a function of the measured thickness of liquid may be provided for.

The optical device is formed by microelectronics or microsystems techniques.

The membrane may be made from organic based materials such as polydimethylsiloxane, polymethyl methacrylate, polyethylene terephthalate, polycarbonate, parylene, epoxy resins or inorganic materials such as silicon, silicon oxide, silicon nitride, silicon carbide, polycrystalline silicon, titanium nitride, diamond carbon, tin and indium oxide, aluminium.

The liquid may be chosen among propylene carbonate, water, an index liquid, an optical oil or instead an ionic liquid.

The optical device may be a liquid lens or a mirror.

The present invention also relates to a camera device that comprises at least one optical device thus characterised.

BRIEF DESCRIPTION OF DRAWINGS

The present invention will be better understood on reading the description of embodiments given purely by way of indication and in no way limitative and by referring to the appended drawings, in which:

FIGS. 3.1 to 3.15 show in section different alternatives of the membrane of the optical device of the invention;

FIGS. 6A to 6I show different alternatives of the reinforced area split up;

Identical, similar or equivalent parts of the different figures described hereafter bear the same numerical references so as to make it easier to go from one figure to the next.

In order to make the figures easier to read, the different parts in the figures are not necessarily represented at a uniform scale.

DETAILED DESCRIPTION OF SPECIFIC EMBODIMENTS

Figure 1A:
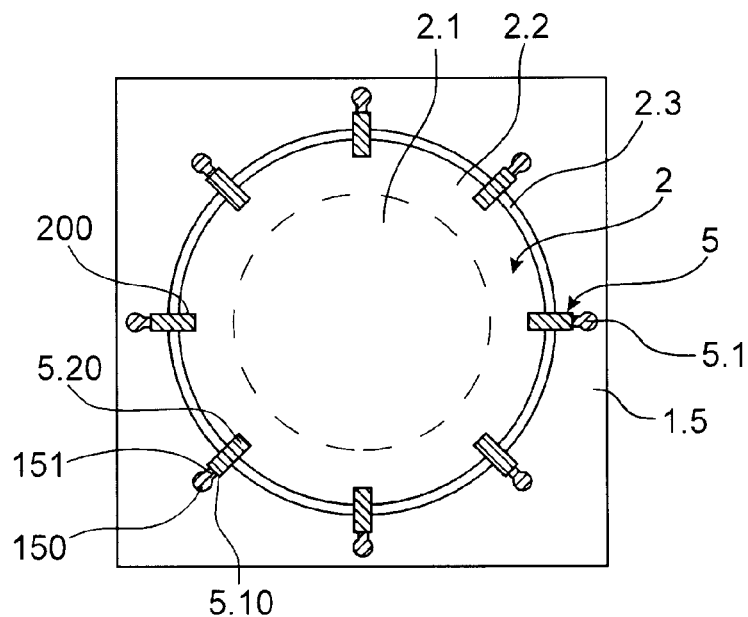
FIGS. 1A to 1E show examples of optical devices according to the invention devoid of reinforced part.
Figure 1B:
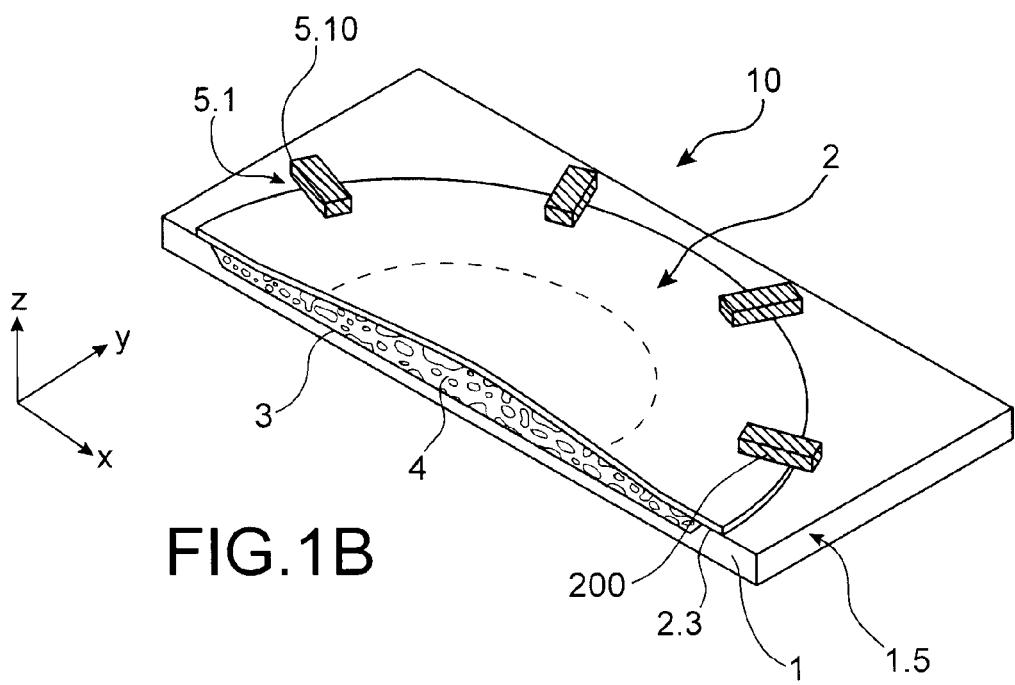
Figure 1C:
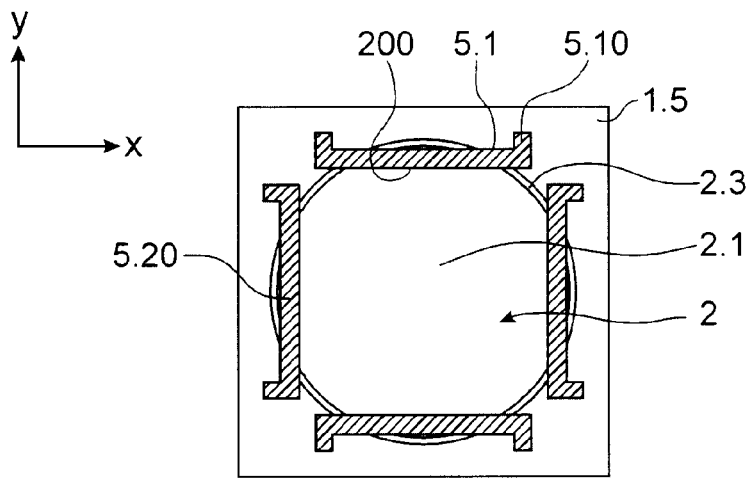

Reference will now be made to FIGS. 1A, 1B, 1C, which show general top view diagrams of examples of simplified optical devices with deformable membrane, objects of the invention.

It is assumed that these optical devices are liquid lenses but this application is not limitative, they could be membrane deformable mirrors.

The liquid lens 10 comprises a membrane 2, the periphery of which is anchored in a sealed manner on a support 1.5. The area of the membrane that is anchored on the support 1.5 is known as anchoring area and is referenced 2.3. In this example, the anchoring takes place in a frame 1 of the support 1.5.

The frame 1 helps to delimit a dish 3 formed in the support 1.5 by lining it. The dish 3 is intended to contain a constant volume of liquid 4. The support 1.5 extends along a principal plane x,y. The dish 3 has a bottom 3.1. An optical beam (not represented) is intended to traverse the liquid lens 10, while propagating through the membrane 2, the liquid 4 and the support 1.5 in the bottom 3.1 of the dish 3. The frame 1 and the dish 3 are not necessary, the support 1.5 can be a substantially flat substrate. The bottom 3.1 is transparent for the optical beam used.

Figure 13A:
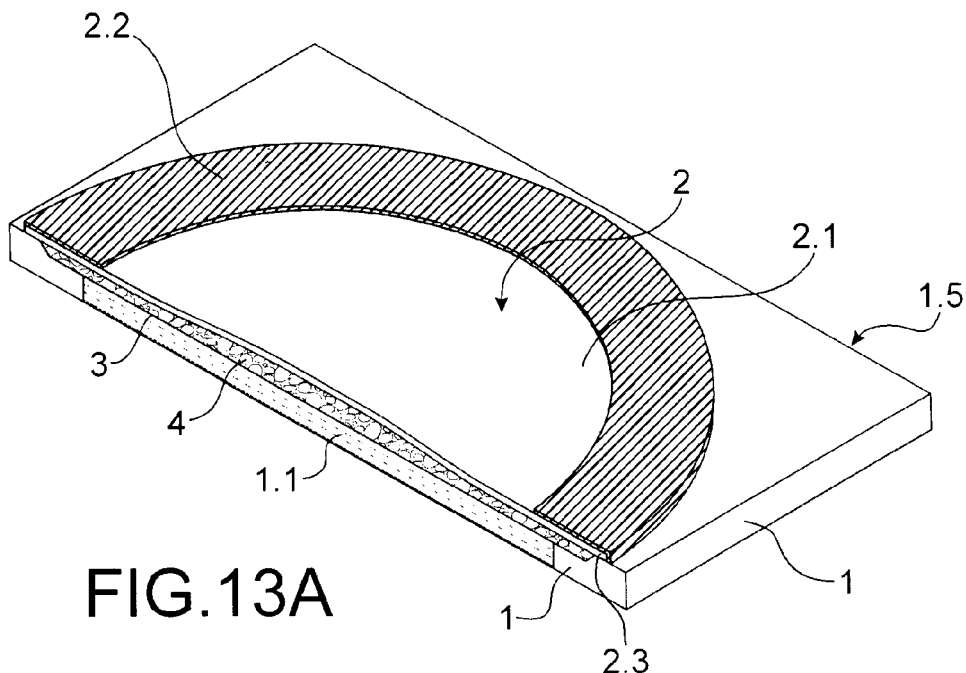
FIGS. 13A to 13E show different configurations of the support of the optical device according to the invention.

The support 1 may be monolithic as in FIG. 1B or be formed by the frame 1 assembled to the bottom 3.1 of the dish 3 as in FIG. 13A.

The liquid 4, the volume of which is constant, may be propylene carbonate, water, an index liquid, an optical oil or instead an ionic liquid. It is chosen in particular for its optical properties in the case of a liquid lens.

If the optical device was a membrane deformable mirror, the membrane would be reflecting, since such a membrane is intended to reflect an incident optical beam. The optical field would not be transparent.

Membrane is taken to mean any flexible film serving as barrier between the liquid 4 and a fluid medium located on the other side of the barrier in relation to the liquid 4. Said fluid may be quite simply air or another gas or even another liquid. The membrane 2, at least in the central area 2.1, is in contact with the liquid 4 on one side and with the fluid on the other at least in a central area 2.1 known as optical field, not just in the application of a liquid lens but also in that of a mirror. Hereafter, the expression central area will sometimes be employed and at others the expression optical field. In this context, these expressions are equivalent. In the liquid lens application, it is the optical field that is going to be traversed by the optical beam and the latter is transparent for the optical beam. In the mirror application, the membrane is reflecting in the central area where the optical beam is incident. The central area has a first face in contact with the liquid and a second face opposite to the first face that forms a dioptre. The material of the membrane is chosen in such a way that it can withstand external stresses such as the expansion of the liquid, impacts, the weight of the liquid due to gravity, without being pierced.

The membrane is represented circular in FIGS. 1A, 1B, 1C but other shapes may be envisaged.

In order to be able to vary the focal distance of the optical device, the liquid is going to be displaced at constant volume so as to vary the thickness of liquid that is located under the membrane in the central area 2.1. Actuation means 5 are provided for, which can go from a rest position to at least one working position in which they deform the membrane 2. These actuation means comprise several micro-beam type actuators 5.1 with piezoelectric or thermal actuation. The actuators 5.1 are distributed at the periphery of the membrane 2. The micro-beams each comprise at least one fixed part 5.10 mechanically joined to the support 1.5 and at least one moving part 5.20 coming into contact, on actuation and in working position, with one part 200 of the membrane 2 so as to deform it, said part 200 of the membrane, known as stressed part 200, being located in an area situated between the optical field 2.1 and the anchoring area 2.3. The moving part of the beam may be one of its ends as in FIGS. 1A, 1B or a median portion as illustrated in FIG. 1C. The fixed part may be at least one end of the micro-beam. In FIG. 1, the stressed parts 200 are not directly visible, they are masked by the actuators 5.1.

The central area 2.1 of the membrane is sufficiently flexible and elastic to be able to deform reversibly when it is activated by the displacement of the parts 200 stressed by the actuators 5.1. The adherence of the membrane to the support 1.5, in its anchoring area 2.3, must be sufficient to withstand the displacement of the remainder of the membrane on actuation. The anchoring area 2.3 has no contact with the liquid 4.

In FIG. 1A, eight radial actuators 5.1 have been represented. This number is only a non limitative example, it could be more. The aim is that the stressed parts 200 of the membrane 2 are distributed substantially regularly around the central area 2.1 so that the displacement can take place in a substantially regular manner. The micro-beams are rectilinear. In FIG. 1A are also represented a power supply pad 150 and a conducting track 151 electrically connected to each of the micro-beam type actuators, said track 151 and said pad 150 being used on actuation to apply the appropriate voltage to the micro-beam type actuator.

In FIG. 1C, there are four actuators 5.1 arranged substantially in a square along the chords of the edge of the membrane 2, the ends of each of the micro-beams being joined to the support 1.5. The micro-beams substantially have the shape of bridges, the pillars of which, situated at the ends, are joined to the support. It is the median parts of the micro-beam that stress the membrane 2, they correspond to the bridge deck.

Figure 1D:
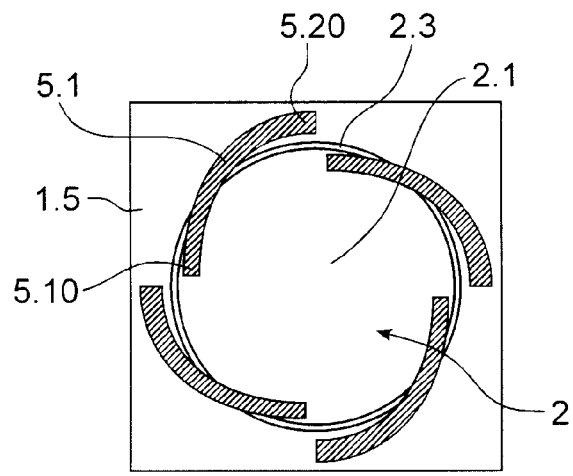
Figure 1E:
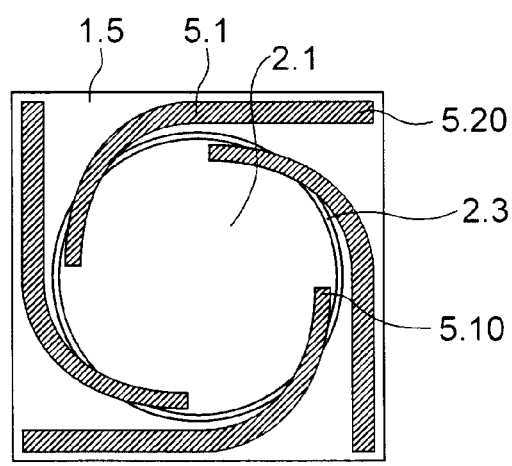

The micro-beams are not necessarily rectilinear. Reference is now made to FIG. 1D. In this figure, they are curved. In FIG. 1E, they are still curved, but are longer because the part mechanically joined to the support ends by a rectilinear portion.

Figure 2A:
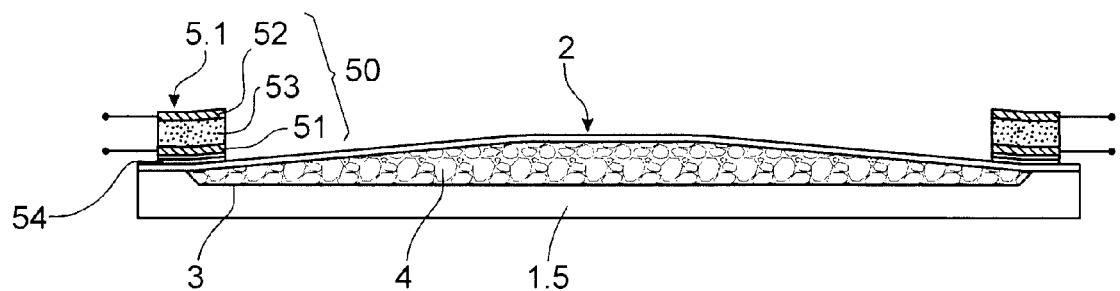
FIGS. 2A, 2B show schematically the actuation means of the optical device of the invention.
Figure 2B:
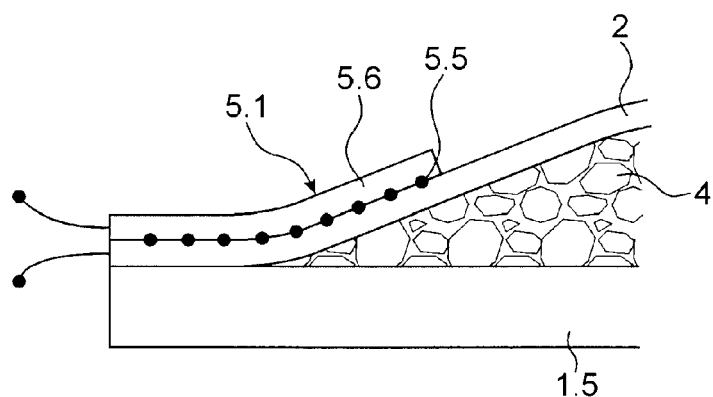

Piezoelectric actuation means are visible in FIG. 2A and thermal type actuation means are visible in FIG. 2B. To form these actuation means, reference may be made for example to the article "The constituent equations of piezoelectric multilayer bending actuators in closed analytical form and experimental results" Sensors and Actuators A 130-131 (2006) 91-98 as regards piezoelectric actuators and the article "Thermally actuated microprobes for new wafer probe card" IEEE Journal of Microelectromechanical Systems, vol. 8, No. 1, March 1999 as regards thermal actuators.

In FIG. 2A, the piezoelectric actuator 5.1 comprises a first part 50 with at least one layer of piezoelectric material 53 sandwiched between two electrodes 51, 52. This first part 50 surmounts a passive part 54 that may be a bilayer of a composite with glass fibres on a layer of nickel. The passive part 54 is overlying the membrane 2, it is inserted between the membrane 2 and the first part 50. The electrodes 51, 52 are intended to be supplied with energy on actuation. A curvature of the beam then takes place, which displaces the membrane 2. The curvature may be in one direction or in the other depending on the type of piezoelectric material used.

In FIG. 2B, the actuator 5.1 is a thermal bimorph effect actuator. Its principle is as follows: a stack of two materials having very different thermal expansion coefficients is used. The two constituents of the bimorph stack sandwich heating means 5.5. By making a current flow in the heating means on actuation, a heating takes place through Joule effect, which has the effect of expanding one of the constituents of the stack more than the other. The constituent that expands the most is opposite the membrane 2 in relation to the heating means 5.5 and that which expands the least is located on the side of the membrane 2. In the example described, which is not limitative, the actuator 5.1 is integrated in the membrane 2, because one of the constituents of the bimorph stack is the membrane 2. It may be silicon oxide. The other constituent of the stack, referenced 5.6, may be made of aluminium for example. Different alternatives of actuation means will be described hereafter. Such micro-beam type actuators are incontestably much less bulky in thickness than those of the prior art and particularly those that are magnetic since the accommodation of the coil in the support needs to be provided for.

Figure 4A:
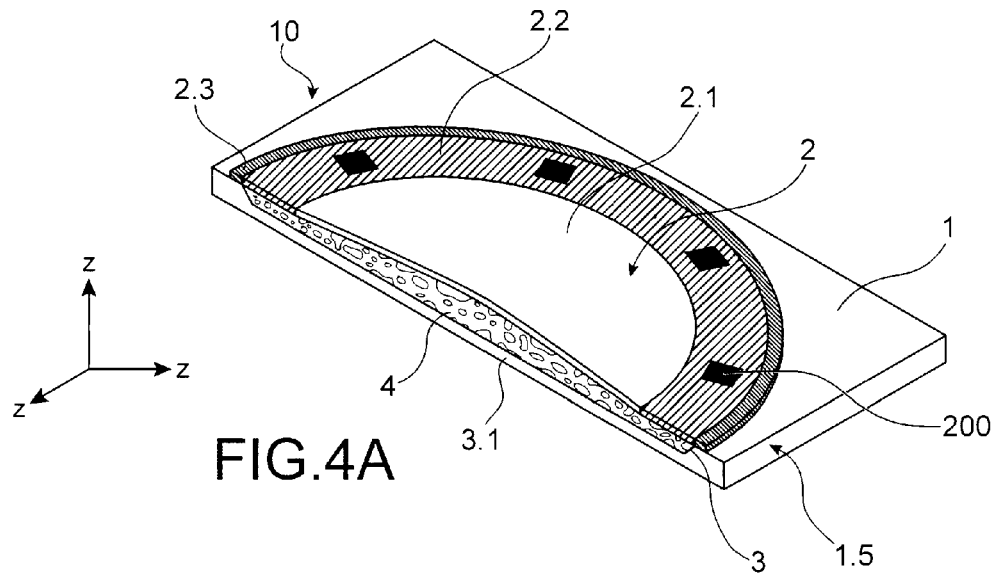
FIGS. 4A, 4B, 4C show yet other alternatives of the optical device of the invention without the actuation means.
Figure 4B:
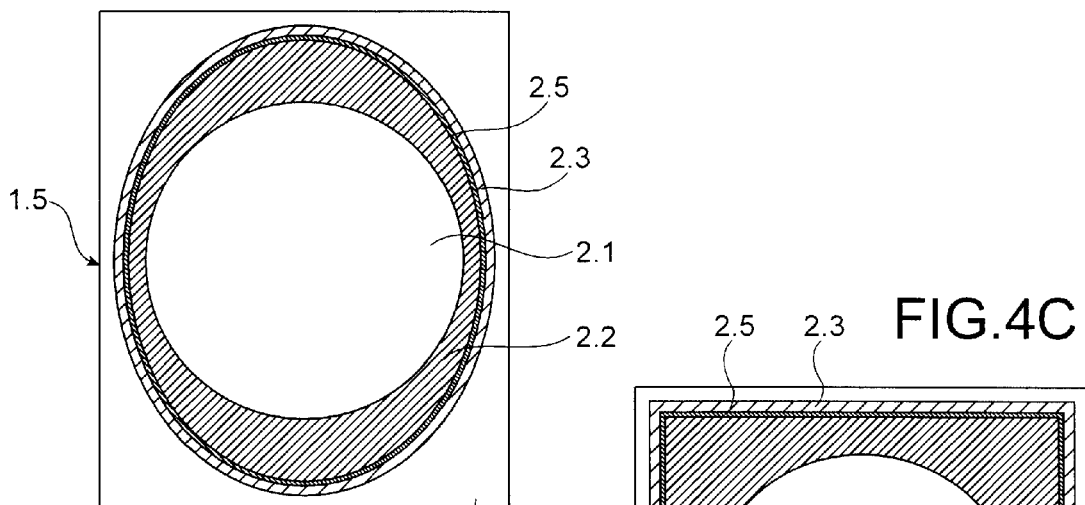

The membrane 2 will now be described. In FIG. 1, the membrane 2 has been represented circular, but in other embodiments it could be elliptic, oblong or even quadrilateral or other. Reference may be made to FIGS. 4A, 4B.

The membrane 2 may be monolayer as in FIG. 2A or multilayer, but at least one layer of the membrane extends over its whole surface. The risks of leaks are reduced since several parts placed side by side are not going to be assembled in the manner of a patchwork as in the prior art. In FIG. 2A, the single layer of the membrane 2 occupies the whole surface of the membrane.

The membrane 2 may be uniform as in FIG. 2A, where uniform is taken to mean that it has both constant and the same physical properties over its whole surface.

Figure 4C:
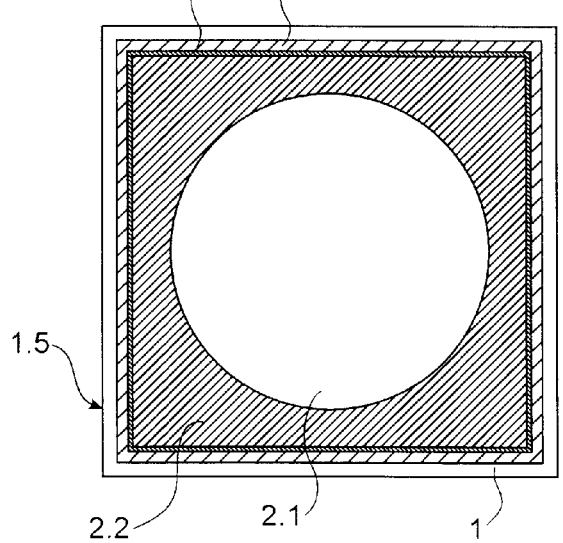

It may be advantageous to improve the efficiency of the actuation means 5, vis-à-vis the displacement of liquid 4, that the membrane 2 is heterogeneous and that its stressed parts 200 are included in a reinforced area 2.2 of the membrane 2, said reinforced area 2.2 surrounding the central area 2.1. Reinforced area 2.2 is taken to mean an area in which the rigidity is greater than that of the central area 2.1 and that of the anchoring area 2.3. The reinforced area 2.2 extends so as to surround the central area 2.1 as illustrated in FIGS. 4A, 4B, 4C. The stressed parts 200 are only visible in FIG. 4A.

The reinforced area 2.2 may be formed of a single part. It surrounds the central area 2.1. It can take substantially the shape of a crown around the central area 2.1 as in FIG. 4A. In an alternative, the reinforced area 2.2 may be subdivided into several reinforced portions 2.2a. If there are several reinforced portions 2.2a, their shapes may be varied as will be seen later. They may form a substantially regular succession that extends around the central area or instead each of them may surround the central area so as to avoid optical aberrations. Each stressed part 200 has a surface area less than that of the reinforced area 2.2, if it is in a single part or instead that of each of the reinforced portions 2.2a, if it is split up.

In reference to FIGS. 3.1 to 3.15, different possible configurations for the membrane 2 when it is heterogeneous will be seen. In these configurations, what is important is that at least one continuous layer 2.12 of the membrane 2 occupies its whole surface.

To dimension correctly the different parts of the membrane 2, two parameters need to be known. They depend on the targeted application. They are the surface area of the central area 2.1, since it corresponds to the optical field desired for the lens or the mirror, and the maximum deflection of the central area 2.1, which is necessary to achieve the requisite variation in the focal distance.

The central area 2.1 may be monolayer (as in FIGS. 3.1, 3.2, 3.4-3.6, 3.10-3.12) or multilayer (as in FIGS. 3.3, 3.7-3.9, 3.13, 3.14, 3.15). If it is monolayer, it is this layer 2.11 that is continuous over its whole surface, if it is multilayer at least one of its layers 2.11 or 2.12 is continuous and extends over its whole surface. In the example of FIGS. 3.3, 3.7-3.9, 3.13, 3.14, the multilayer central area 2.1 comprises two superimposed layers 2.12 and 2.11, and these two layers 2.12, 2.11 extend over the whole surface of the membrane. This is not an obligation, it is sufficient that only one of them ensures the continuity. In FIG. 3.15, the central area 2.1 is bilayer and only one of the layers 2.12 is continuous over the whole surface, the other layer referenced 2.13 is limited to the central area.

The choice of the multilayer central area 2.1 is made to meet the requirements of the method of production or so that the liquid lens or the mirror attains certain performances. The central area 2.1 may thus be composed of a single material or of several depending on whether it is monolayer or multilayer. The elastic limit of the central area 2.1 is sufficient to ensure a deformation in the elastic domain and thus a reversibility of the deformation, in other words a return to an initial position once the actuation means have ceased to act. Numerous materials have both the optical properties of transmission, for example in the visible, and the requisite elasticity. For example, organic materials such as polydimethylsiloxane (PDMS), polymethyl methacrylate (PMMA) may be cited, but also polyethylene terephthalate (PET), polycarbonate (PC), parylene, epoxy resins, the Young's modulus of which is between several 100 MPa and several GPa, or inorganic materials such as silicon oxide, silicon nitride, the Young's modulus of which equals several hundreds of GPa.

The central area 2.1 may have a substantially constant thickness of around several micrometers for inorganic materials or even more for organic materials, as in FIGS. 3.1, 3.3 to 3.14 or, quite the opposite, a variable thickness as in FIG. 3.2. The choice of the profile with variable thickness makes it possible to adjust the dioptre of the liquid lens, on the membrane side.

The reinforced area 2.2 must be sufficiently rigid to pass onto the liquid 4 the pressure applied by the actuation means 5 and thus generate the requisite displacements of the liquid 4. The reinforced area 2.2 comprises the layer 2.12 from the central area 2.1 but this layer 2.12, such that it is present in the central area 2.1, is not sufficiently rigid. To increase the rigidity of the layer or the layers 2.11, 2.12 from the central area 2.1, at least one additional layer 2.20 may be added to them of a material having a Young's modulus higher than that of the material or the materials of the layers 2.12, 2.11 from the central area 2.1, which leaves a wide choice in terms of materials since the optical properties of transparency are no longer necessary, the reinforced area 2.2 no longer needing to be transparent to the radiation because outside of the optical field. It is instead adhesion properties that are requisite in the choice of the additional layer 2.20. This alternative is illustrated in FIGS. 3.1-3.4, 3.7-3.9, 3.11, 3.12, 3.14. The additional layer 2.20 may be located on one or the other face of the reinforced area 2.2, in other words either on the liquid 4 side, or the other side. The additional layer is on the liquid 4 side in FIGS. 3.12 and 3.14 and the other side in FIGS. 3.1-3.3, 3.7-3.9, 3.11 and 3.15. The choice of the material and the thickness of the additional layer 2.20 may be made in an experimental and iterative manner.

Several materials for the additional layer 2.20 are listed below. It may be a metallic material such as titanium, titanium nitride, aluminium, the thickness of which will be of the order of several micrometers and the Young's modulus of which is between several tens of GPa to several hundreds of GPa. It may be materials such as silicon oxide, silicon nitride, the thickness of which will be of the order of several micrometers and the Young's modulus of which is between several tens of GPa to several hundreds of GPa. Finally, it may be organic materials such as photosensitive polymers and in particular benzocyclobutenes (BCB), the thickness of which will be of the order of several tens of micrometers and the Young's modulus of which is several GPa.

When the actuation means 5 are thermal actuation means formed of a bimorph stack and the membrane 2 is a constituent of the bimorph, said constituent may be that of the layer that extends over the whole surface of the membrane or that of the additional layer.

In an alternative or combination, to obtain the requisite rigidity for the reinforced area 2.2, it is possible to thicken the layer 2.12 from the central area 2.1. Such a thickening is illustrated in FIGS. 3.5, 3.6, 3.10, 3.1, 3.12, 3.13, 3.14, 3.15. If there are several layers 2.11, 2.12 from the central area 2.1, it is possible to thicken one or more of these layers, as it happens the layer 2.11, as in FIG. 3.14. This alternative risks being less efficient than the addition of the additional layer, but in certain applications it is sufficient. In this case, the conception of the actuation means 5 has an influence on the thickness of the layer 2.12 from the central area 2.1 in the second peripheral area 2.2 and this thickness may be doubled compared to that of the layer 2.12 in the central area 2.1. The anchoring area 2.3 may be formed from the same material as the central area 2.1 in so far as the latter is formed from a single material. This alternative is represented in FIGS. 3.1, 3.2, 3.4, 3.5, 3.6.

If the central area 2.1 is multilayer and formed of several materials, the anchoring area 2.3 can take all of the materials of the central area 2.1 as in FIG. 3.3 or be limited to one or more of them as illustrated in FIG. 3.7.

The thickness of the anchoring area 2.3 is preferably similar to that of the central area 2.1, in other words of the order of several micrometers for inorganic materials and of the order of several tens of micrometers or even more for organic materials. Obviously, it is possible that the thickness of the anchoring area 2.3 is different to that of the central area 2.1, while remaining within the same order of magnitude. Reference may be made to FIGS. 3.2 and 3.8. In order to optimise the adhesion of the anchoring area 2.3 on the frame 1, it is possible to provide for a prior treatment of the frame before the fixation. It is possible, for example, to carry out a surface treatment with a plasma for example with oxygen or instead to carry out a deposition with a layer of adhesion primer material.

The mechanical behaviour of the central area 2.1 depends on the surface of the reinforced area 2.2 and the force of the actuation means 5. The dimensioning of the central area 2.1 may be made by relying on the work "*Théorie des plaques et des coques*" (Theory of plates and shells) by S. Timoshenko, editor Librairie Polytechnique, Ch Béranger, 1951 as will be seen later.

In this work are presented several approximate formulas relative to a uniformly loaded circular plate. As a function of the requisite maximum deflection $\omega_o$ for the central area 2.1 and its thickness, different models are described in this work, making it possible to dimension the reinforced area 2.2 correctly.

Different possible configurations for the reinforced area 2.2 will now be described, while referring to FIGS. 5A to 5E. The reinforced area 2.2 stops in all cases before the optical field 2.1, it does not encroach upon it. It may extend up to the anchoring area 2.3 but does not encroach upon it either since in the anchoring area 2.3, there is no liquid and the membrane cannot be displaced. On the other hand, the actuation means 5 may be in contact with the membrane 2 also in the anchoring area 2.3. This aspect will be described later.

Figure 5A:
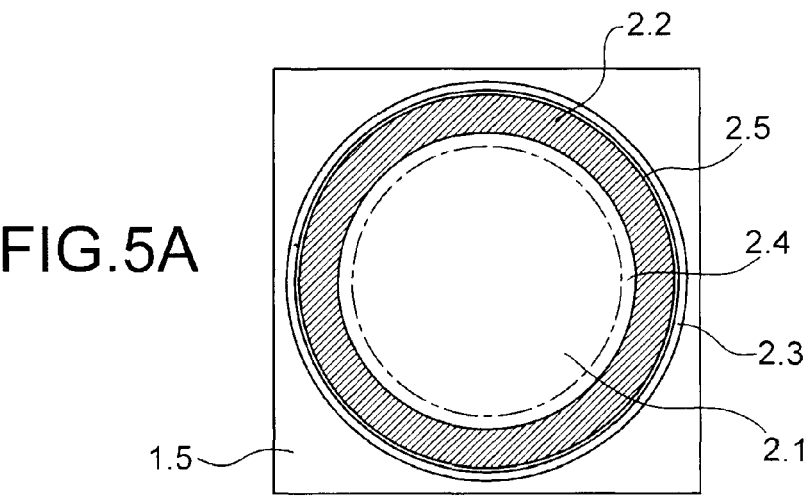
FIGS. 5A to 5E show different alternatives of the reinforced area in a single part.
Figure 5B:
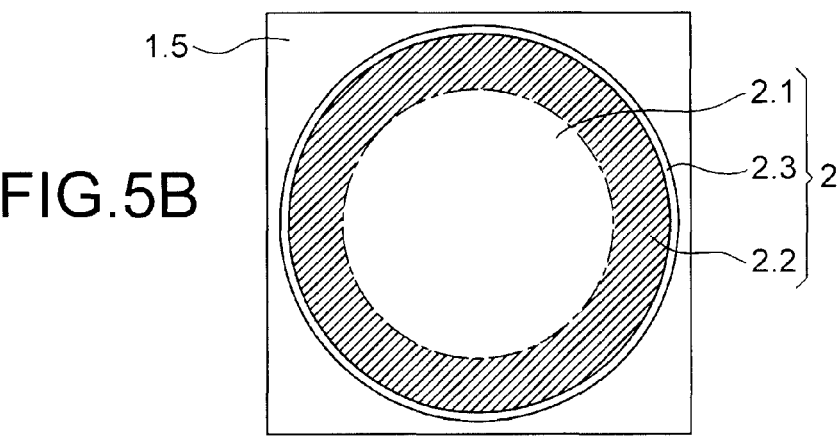
Figure 5C:
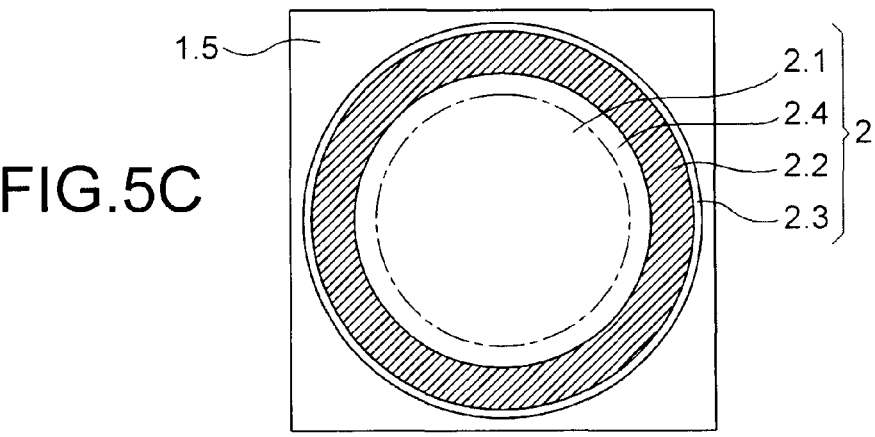

In these FIGS. 5A to 5E, the actuation means are not represented, nor are the stressed parts. In FIGS. 5A to 5C, the reinforced area 2.2 is in a single part, it is in the shape of a crown that surrounds the optical field 2.1. What is going to be described would apply just as well if it was split up.

It is possible, as in FIG. 5B, that the reinforced area 2.2 begins from the limit of the optical field 2.1. The dotted lines schematise the limit of the optical field 2.1.

It is obviously possible to interpose an intermediate guard area 2.4 between the optical field 2.1 and the reinforced area 2.2 as in FIG. 5A and FIG. 5C. This makes it possible to avoid any degradation of the optical performances of the optical field 2.1.

An intermediate guard area 2.5 may be interposed between the reinforced area 2.2 and the anchoring area 2.3 as in FIG. 5A. It is located above the liquid, but the latter is not visible in FIGS. 5A to 5C. The reinforced area 2.2 may reach the anchoring area 2.3 without encroaching upon it as in FIG. 5B and FIG. 5C. There is no longer an intermediate guard area 2.5. The intermediate guard areas 2.4, 2.5 have also been illustrated in certain FIG. 3. They comprise at least the continuous layer 2.11 and/or 2.12, if necessary thinned. The intermediate guard area 2.5 situated between the central area 2.1 and the reinforced area may be different to the reinforcement area 2.6.

FIGS. 4B, 4C show respectively square or oblong membrane configurations, in this case ellipse shaped. In these two configurations, the optical field 2.1 is circular. The reinforced area 2.2 is limited internally by a circle and externally respectively by a square or an ellipse.

Figure 5D:
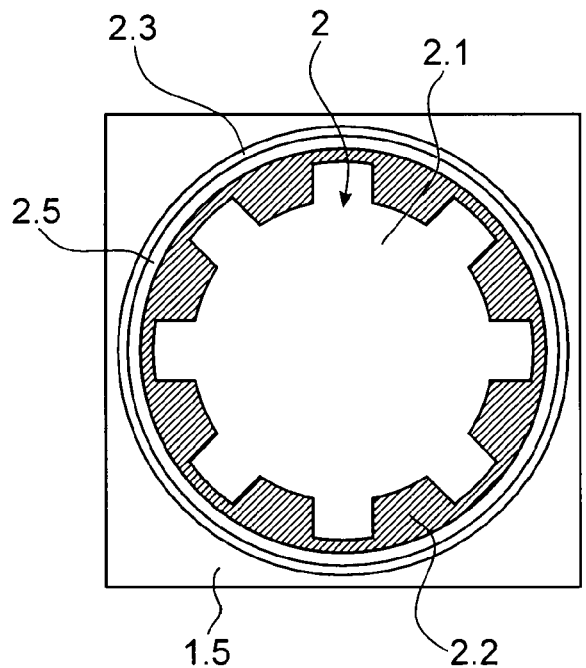

In FIG. 5D, the membrane 2 is circular, the single reinforced area 2.2 takes the shape of a crown provided with radial fingers, projecting towards the optical field 2.1. These fingers take the shape of crown sectors, but other shapes are possible, this shape is not limitative. There is a guard area 2.5 between the stressed part 2.2 and the anchoring area 2.3. A micro-beam type actuator could be placed in each of the radial fingers. They have not been illustrated in FIG. 5D.

Figure 5E:
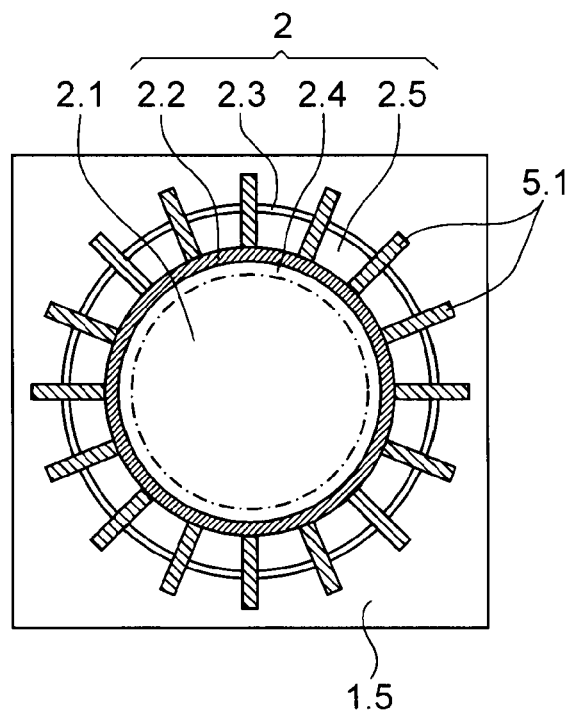

In FIG. 5E, the membrane 2 is circular, the reinforced area 2.2 is single, it is crown shaped on the side of the optical field 2.1 and the crown is provided with radial fingers that project towards the anchoring area 2.3. The fingers are in strip shape but other shapes are possible. There is an intermediate split up guard area 2.5 between the crown of the reinforced area 2.2 and the anchoring area 2.3 between the radial fingers. Micro-beam type actuators 5.1 are schematised, they cover the radial fingers, do not encroach upon the crown and extend beyond the radial fingers on the support 1.5. In the radial fingers, a superposition of hachuring is consequently observed. The stressed parts correspond to the radial fingers but not to the crown.

Until now in FIG. 5, only configurations with a reinforced area 2.2 in a single part have been described. Configurations of the membrane 2 will now be described for which the reinforced area 2.2 is split up into several reinforced portions 2.2a. At least one actuator 5.1 cooperates with each of these reinforced portions 2.2a. The micro-beam type actuators 5.1 are schematically shown in FIG. 6A only.

Figure 6A:
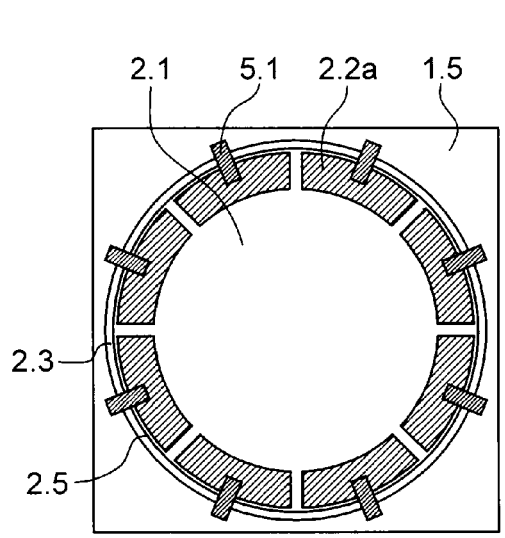
Figure 6B:
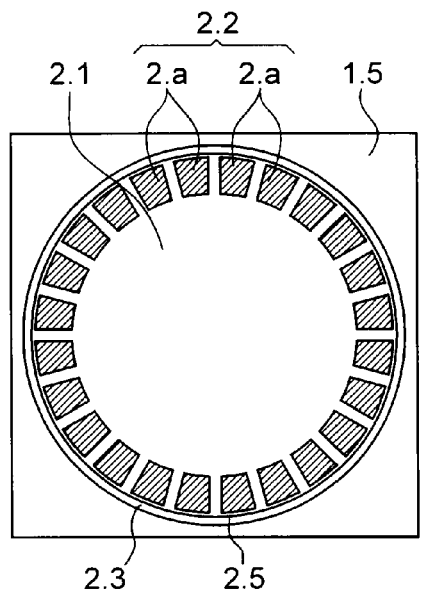
Figure 6C:
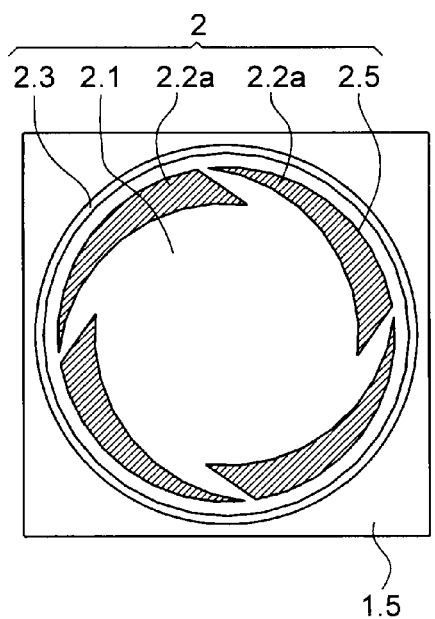
Figure 6D:
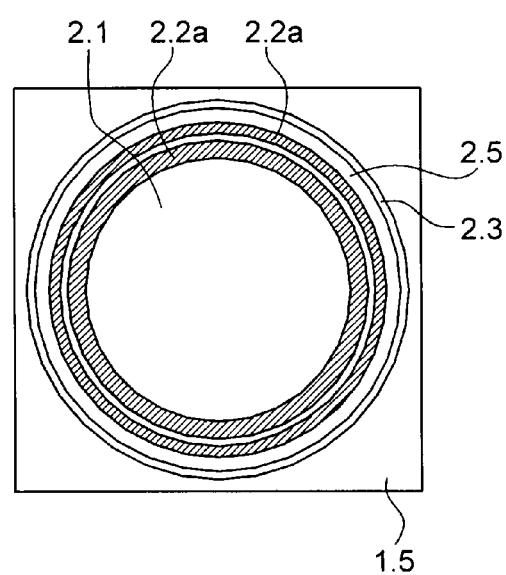

In FIG. 6A, the reinforced portions 2.2a are crown sectors, in the non limitative example, the crown is circular. There are 8 of them in FIGS. 6A and 24 in FIG. 6B. A different number of reinforced portions 2.2a is obviously possible. In FIG. 6C, the reinforced portions 2.2a are portions of crescents, the exterior edge of which is a portion of concentric circle with the edge of the membrane 2. There are four substantially identical reinforced portions 2.2a. It could be envisaged that they are not identical. In FIG. 6D, the reinforced portions 2.2a are concentric crowns. There are two of them. It could be envisaged that at least one of them is provided with radial fingers in a manner similar to FIGS. 5D, 5E. This alternative is not represented so as not to multiply needlessly the number of figures. In FIGS. 6C, 6D, there is an intermediate guard area 2.5 between the anchoring area 2.3 and the reinforced area 2.2.

Figure 6E:
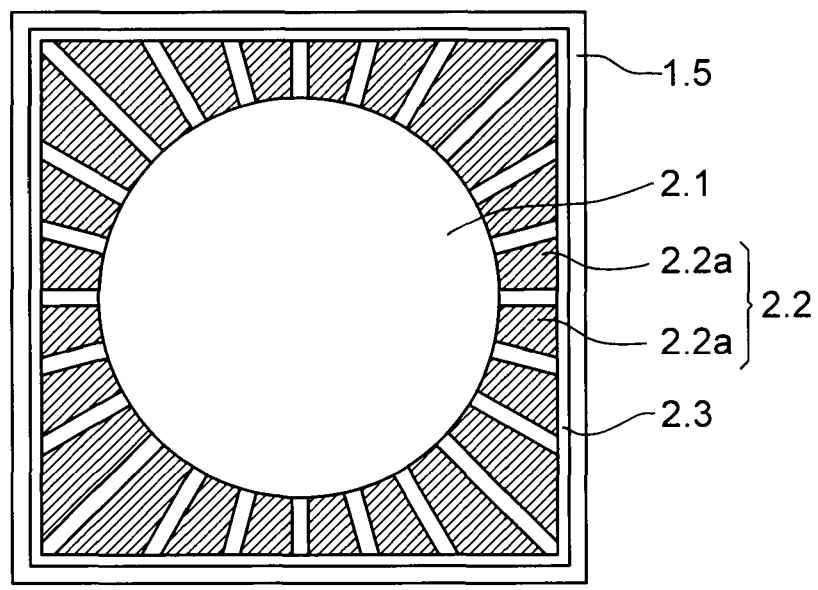

In FIG. 6E, the reinforced portions 2.2a are portions of angular sectors limited internally by the optical field 2.1, in this circular example, and externally by the edge of the support 1.5 receiving the anchoring area 2.3, which in this example is square. The angular sectors have substantially the same angle at the summit but this is not an obligation.

Figure 6F:
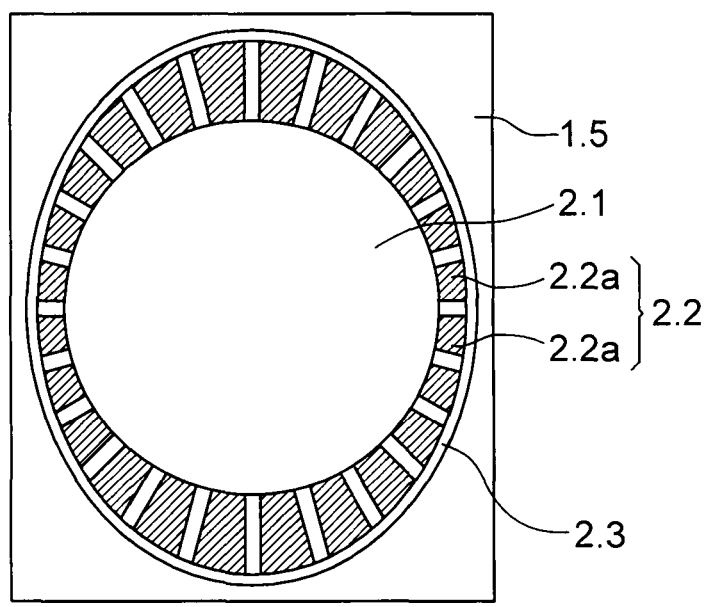

In FIG. 6F, in the same optic, the reinforced portions 2.2a are portions of angular sectors limited internally by a circle that corresponds to the optical field and externally by an ellipse that corresponds to the edge of the support 1.5 receiving the anchoring area 2.3. In these two examples, the different reinforced portions 2.2a are not all identical.

In FIG. 6G, the reinforced portions 2.2a are radial strips that stop just before the anchoring area 2.3. They are substantially polygonal.

In FIG. 6H, the reinforced portions 2.2a are portions of crown provided with radial fingers. This configuration resembles that of FIG. 5E with the exception that the reinforced area is split up. In this example the radial fingers project towards the anchoring area 2.3, but it could be conceived that they project towards the optical field 2.1. This latter alternative is not represented so as not to multiply needlessly the number of figures.

It is preferable to provide for, when there is a plurality of neighbouring reinforced portions 2.2a and when the plurality of reinforced portions 2.2a forms a discontinuous crown around the optical field 2.1, between the reinforced, area 2.2 and the optical field 2.1, a reinforcement area 2.6 more rigid than the optical field 2.1. The reinforcement area 2.6 is continuous and surrounds the optical field 2.1. The actuation means (not represented) do not stress it directly. The function of the reinforcement area 2.6 is to equalise the deformation of the membrane 2 in the optical field 2.1 on the activation of the actuation means. The reinforcement area 2.6 assures the invariance by rotation of the deflection of the membrane brought about by the actuation of the actuation means around the z axis, which is an axis of symmetry. Reference may be made to FIG. 6I. The reinforced portions 2.2a are substantially circular.

Figure 7A:
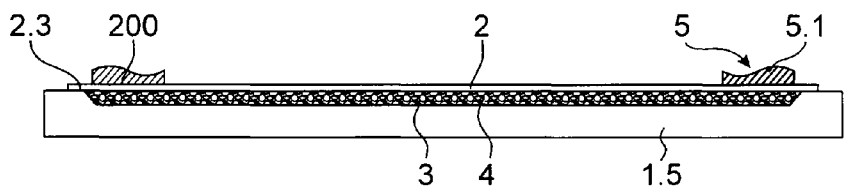
FIGS. 7A to 7N show in section different configurations of the actuation means.
Figure 7B:
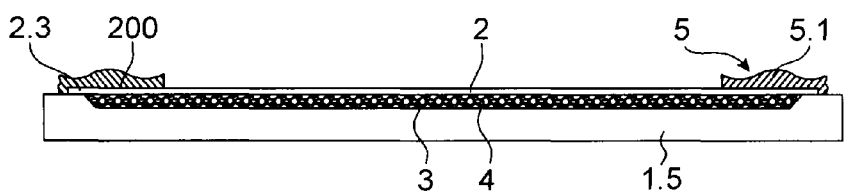
Figure 7C:
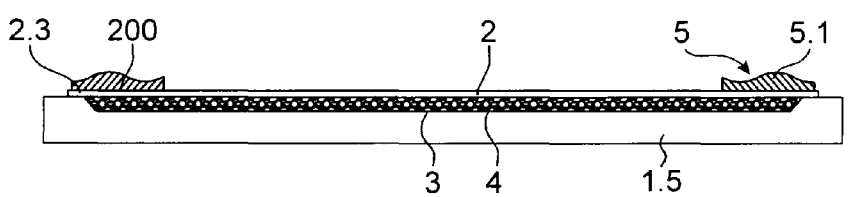
Figure 7D:
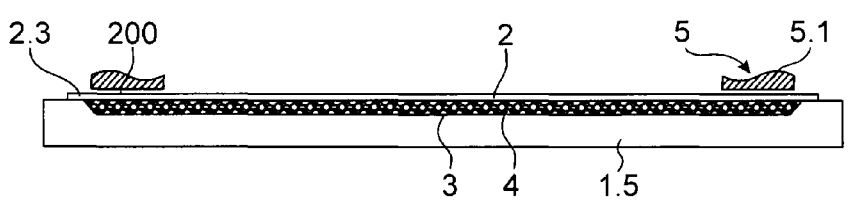
Figure 7E:
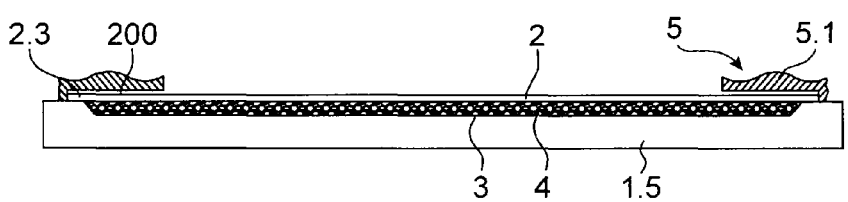
Figure 7F:
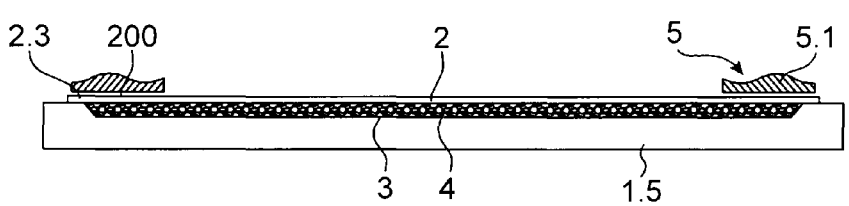
Figure 7G:
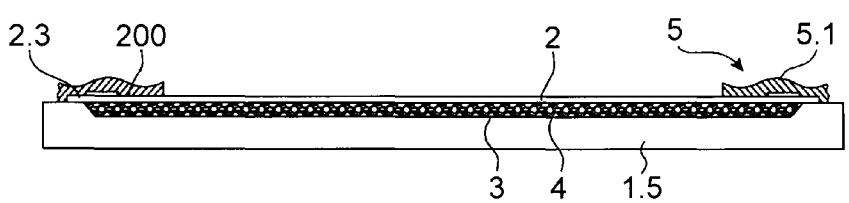
Figure 7H:
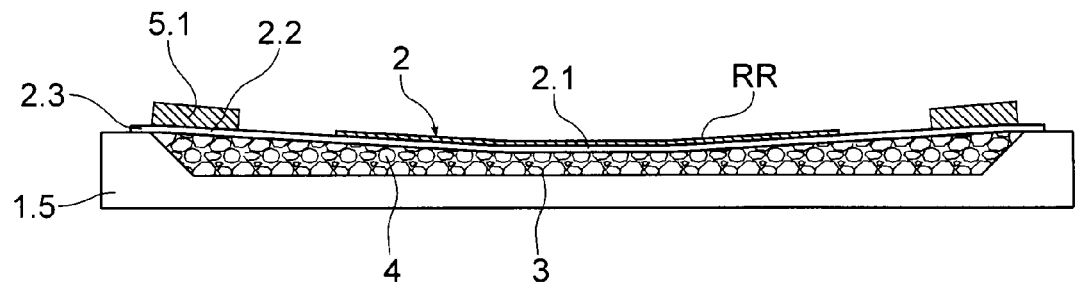
Figure 7I:
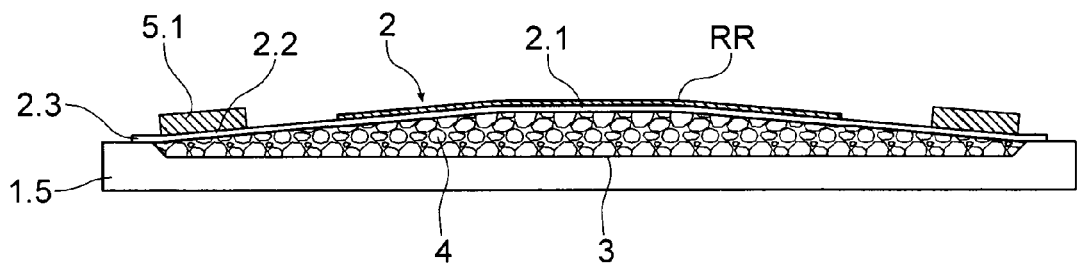
Figure 7J:
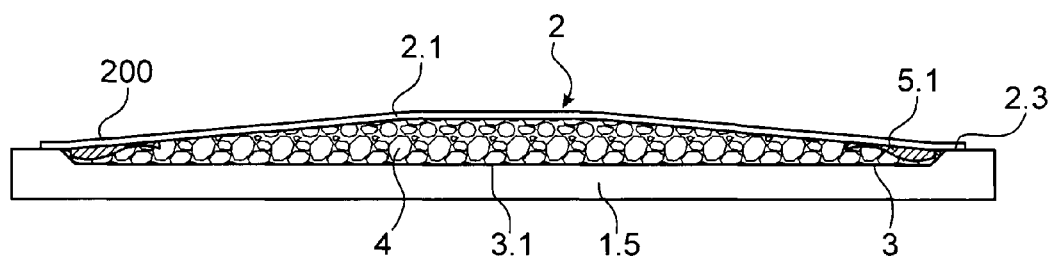
Figure 7K:
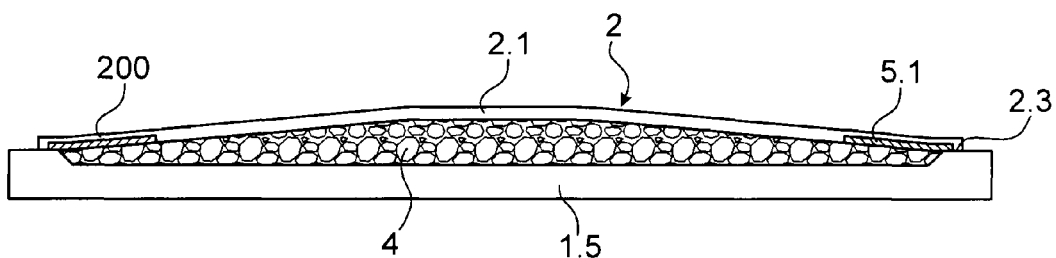
Figure 7L:
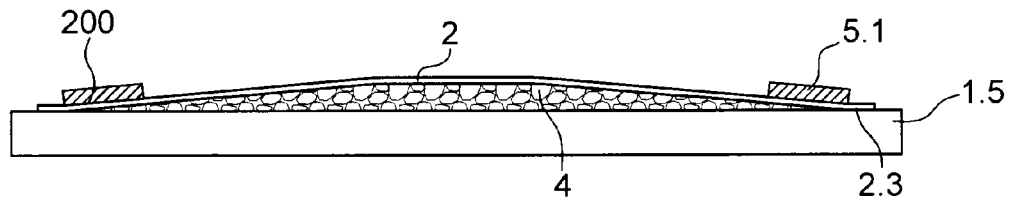
Figure 7M:
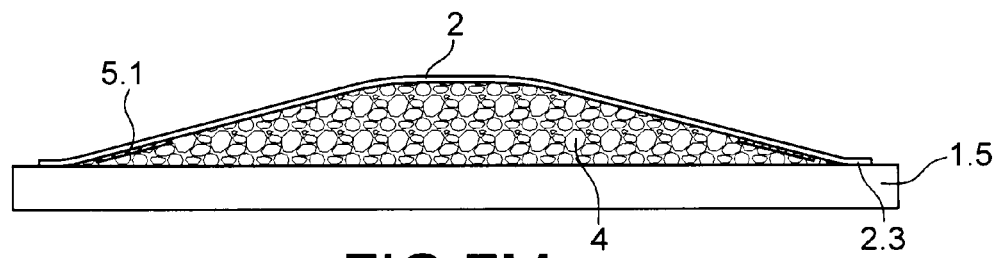
Figure 7N:
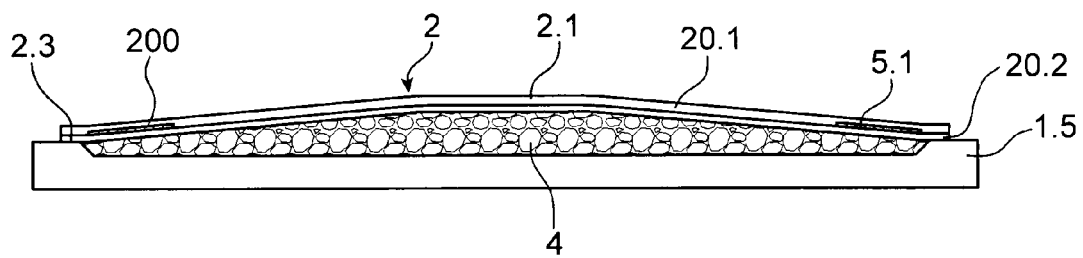

In FIGS. 7A to 7N, different configurations for the actuation means 5 have been illustrated.

On actuation, each micro-beam type actuator 5.1 comes into contact with the membrane at least in the stressed part 200. But it can also be in total or partial contact with the membrane in the anchoring area 2.3. It is joined to the support 1.5 either directly, or indirectly, by means of the membrane in the anchoring area 2.3 or by means of another part that is fixed to the support.

At rest, the actuator 5.1 may be without contact with the membrane 2 whether in the stressed part 200 or instead the anchoring area 2.3.

In an alternative, still at rest, the actuator 5.1 may be in contact with the stressed part 200 and even joined to the stressed part 200. In the same way, it may be in partial or total contact with the anchoring area 2.3 and even be joined to the anchoring area 2.3.

In FIG. 7A, the micro-beam type actuator 5.1 comes, at rest, into contact with the membrane 2 in the stressed part 200 but not in the anchoring area 2.3. This figure does not show its direct or indirect contact with the support 1.5. In FIG. 7B, the micro-beam type actuator 5.1 comes, at rest, into contact with the membrane in the stressed part 200, of the anchoring area 2.3 and is joined to the support 1.5. In FIG. 7C, the micro-beam type actuator 5.1 comes, at rest, into contact with the membrane in the stressed part 200 and the anchoring area 2.3.

In FIG. 7D, the micro-beam type actuator 5.1 at rest is without contact with the membrane 2. It surmounts the stressed part 200. It is assumed that it surmounts the anchoring area 2.3 and is joined to the support 1.5, but this figure does not show it.

In FIG. 7E, the micro-beam type actuator 5.1 is, at rest, without contact with the stressed part 200 and with the anchoring area 2.3 but is joined directly to the support 1.5. In FIG. 7F, the micro-beam type actuator 5.1 is at rest without contact with the stressed part 200 or with the anchoring area 2.3. Its fixation to the support 1.5 is not seen.

In FIG. 7G, the micro-beam type actuator 5.1 is, at rest, in contact with the stressed part 200 and the anchoring area 2.3 but is not in contact with the membrane 2 between the stressed part 200 and the anchoring area 2.3. In the other figures with contact, as in FIGS. 7A, 7B, 7C, the stressed part 200 was juxtaposed with the anchoring area 2.3. In FIG. 7G, this is not the case, the stressed part 200 and the anchoring area 2.3 are disjointed. In FIG. 7, no reinforced area is represented. Provision could obviously be made for a split up or not.

The membrane 2 may be flat when the actuation means 5 are at rest as in FIGS. 7A to 7G. The dish 3 is necessary to contain the liquid 4. This corresponds to an infinite radius of curvature. It is obviously possible that the membrane 2 bulges in one direction or in the other while the actuation means 5 are at rest. It then has a finite radius of curvature and is thus smaller. FIGS. 7H and 7I illustrate this configuration with respectively a domed membrane 4 (concave) and a dished membrane 2 (convex). It is assumed that in FIGS. 7H, 7I the membrane is reflecting and that the optical device is a mirror. On the front face of the membrane 2, at least in the central area 2.1, a reflective coating RR has been represented, which may be for example a thin layer of aluminium.

The examples presented in FIGS. 5A to 5I showed actuation means 5 that cooperate with one front face of the membrane 2, in other words that which is opposite to that in contact with the liquid 4. It is obviously possible that the actuation means 5 cooperate with the membrane 2 at its face in contact with the liquid 4.

In FIG. 7J, the micro-beam type actuator 5.1 is in contact with the membrane 2 but also with the liquid 4. It is on a rear face of the membrane 2.

When they are actuated from the rest position, the actuators 5.1 need to pull the membrane 2 to bring the stressed part 200 closer to the bottom 3.1 of the dish 3 or more generally to reduce the thickness of the liquid 4 in the optical field. In this FIG. 7J, the membrane 2 is uniform, it has a same thickness and a same rigidity between the optical field 2.1 and the stressed part 200.

In FIG. 7K, the micro-beam type actuator 5.1 is joined to the membrane 2 and integrated in the membrane 2. It is still in contact with the liquid 4. The thickness of the membrane 2 in the part 200 stressed by the actuator 5.1 is less than that in the optical field 2.1. The thickness of the stressed part 200 combined with that of the actuator 5.1 is substantially that of the optical field 2.1. In this FIG. 7K, the actuator 5.1 also comes into contact with the support 1.5, the membrane 2 surmounts the actuator 5.1 and also comes into contact with the support 1.5.

The dish 3 is not necessary, as has already been indicated. It is possible that the liquid 4 lies on a substantially flat support 1.5 and that the membrane 2 contains it. Patent application EP-A-1 672 394 illustrates such a liquid containing membrane configuration. This alternative is represented in FIGS. 7L and 7M, the micro-beam type actuator 5.1 is joined to the membrane 2, it is located either on the front face of the membrane 2 or on the rear face. In these configurations, the membrane 2 is bulging when the actuation means 5 are at rest. The membrane 2 may be formed by deposition of an organic film, for example of parylene, directly on a drop of liquid 4, or by a method using a sacrificial layer. The support 1.5 may if necessary be treated locally to make it hydrophilic or hydrophobic according to the areas.

In FIG. 7N, the micro-beam type actuator 5.1 is buried in the membrane 2, it is sandwiched between two sub-layers 20.1, 20.2 of the membrane 2. It is integrated in the membrane 2.

Figure 8:
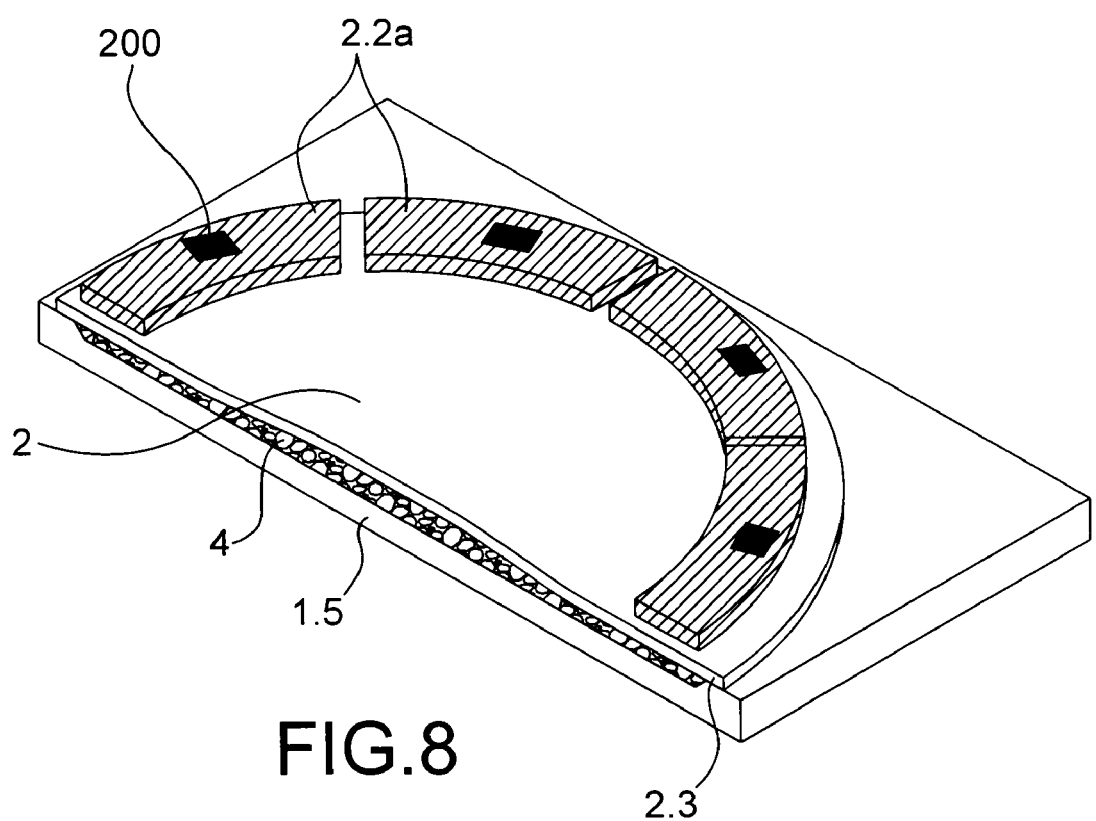
FIG. 8 shows the strain applied to the split up reinforced area by the actuation means.

In reference to FIG. 8, the strain applied by a micro-beam type actuator to a reinforced portion 2.2a of the membrane 2 will now be described. The actuator is not represented but what is visible is the stressed part 200, the localised surface of which is less than that of the reinforced portion 2.2a. The strain will preferably be a force directed along the z axis. Obviously, if the reinforced area was in a single part the stressed part would have a surface area less than that of the reinforced area. Several stressed parts would cooperate with the reinforced area. It may be conceived that several stressed parts cooperate with a reinforced portion.

The dimensioning of the membrane 2 is guided by the behaviour that it will have in the optical field 2.1, since the variation in the focal distance or the curvature of the optical device depends directly on the displacement of the optical field.

The material of the membrane 2 and more particularly its layer that occupies the whole surface of the membrane 2 is chosen so that its elastic limit is sufficient to ensure it works in the elastic domain and has reversibility of deformation. It must return to its initial position once it has been deformed, by activation of the actuation means 5, when these have returned to a rest position. Numerous organic and also inorganic materials can enter into the composition of the membrane 2. They must be able to ensure the sealing to contain the liquid 4, particularly in the anchoring. Depending on the applications and the structures, they must be transparent for the wavelength used in the case of working in transmission or must be reflecting, in the case of working in reflection. They may be dielectric or, quite the opposite, electrically conducting as will be seen later.

Organic materials that may be chosen are for example polydimethylsiloxane (PDMS), polymethyl methacrylate (PMMA) but also polyethylene terephthalate (PET), polycarbonate (PC), parylene, epoxy resins, the Young's modulus of which is between several 100 MPa and several GPa. Inorganic materials that may be chosen are for example silicon, silicon oxide, silicon nitride, silicon carbide, polycrystalline silicon, titanium nitride, diamond carbon. Conductor materials that may be chosen are for example indium and tin oxide ITO, which is transparent in the visible, or aluminium, which for its part is reflecting. A configuration of the optical device according to the invention will be seen later in which the membrane is both electrically conductor and is either transparent or reflecting.

For a correct operation of the optical device of the invention, it is desirable that its optical performances are ensured independently of its orientation.

To do this, the pressure induced by the weight of the liquid 4 on the membrane 2 in the optical field 2.1, due to the heaviness, must not bring about any deformation degrading its optical performances.

The profile of the membrane 2 has a strong influence on the shape of the dioptre of the optical field. For a flat profile, in other words for a substantially constant thickness of the membrane 2 over its whole surface, the shape of the dioptre may be approximated by the following formula taken from the document "*Théorie des plaques et des coques*" by S. Timoshenko, editor Librairie Polytechnique, Ch Béranger, 1951. One obtains:

$$\omega(r) = \omega_0 \times \left(1 - \frac{r^2}{a^2}\right)^2$$

where $\omega(r)$ represents the deformation of the membrane (or deform) as a function of the distance r from its centre (which is also the optical centre of the lens), a represents its radius and $\omega_o$ its maximum deflection in its centre.

The approximation made is to consider the membrane as anchored to its periphery and subjected to a constant pressure. In terms of deform, the real profile of the dioptre needs to be determined more precisely for example by means of mechanical simulation software such as ANSYS for example. The real deform is very likely situated between the approximate deform and a spherical deform.

By varying the thickness of the membrane and the nature of the strain exercised by the actuation means, it is possible to vary the deform and thus change the shape of the dioptre, the focal distance or the curve if it is a mirror.

The mechanical behaviour of the membrane depends in particular on the surface of the reinforced area 2.2 if it exists. It is arranged so that the rigidity of the membrane 2 in the optical field 2.1, in other words the parameters E, ν and h, is in keeping with the surface area of the reinforced area 2.2 and with the force that the actuation means 5 develop. Indeed, the pressure exercised by the liquid 4 on the optical field 2.1 multiplied by the total surface of the membrane in contact with the liquid 4 is equal, as a first approximation by considering the liquid as incompressible, to the force developed by the micro-beam type actuators 5.1.

The mechanical behaviour of the membrane in the optical field thus depends on the maximum deflection of the membrane, the force applied by the actuation means 5, their travel and the surface area of the reinforced area 2.2. Several iterations may be necessary to adapt the mechanical behaviour of the optical field 2.1 with the magnitudes listed above.

To reach a worthwhile compromise, firstly one or more materials must be chosen for the membrane as a function of the desired variation in the focal distance and the geometry of the optical field, the method of making the membrane and the actuation means, the thickness of the membrane, several thicknesses may be examined. The maximum pressure in the optical field must then be determined. The surface of the reinforced area is optimised by taking the most favourable case where the reinforced area is continuous and uniform around the optical field, by comparing the strains and travels necessary for the actuation in order to obtain the requisite variation in focal distance compatible with the technology of the actuation retained, taking into account the overall size, which it is aimed to reduce. If a dead end is reached, the iterations are begun once again by changing materials for the membrane.

Since the candidates in terms of materials are numerous, the thickness of the membrane can vary significantly, the maximum pressure required may thus be adjusted in a judicious manner.

The number of reinforced portions, if there are several of them, is also an important parameter for the elaboration of the optical device, object of the invention. Each of these reinforced portions is controlled by at least one micro-beam type actuator.

Figure 9A:
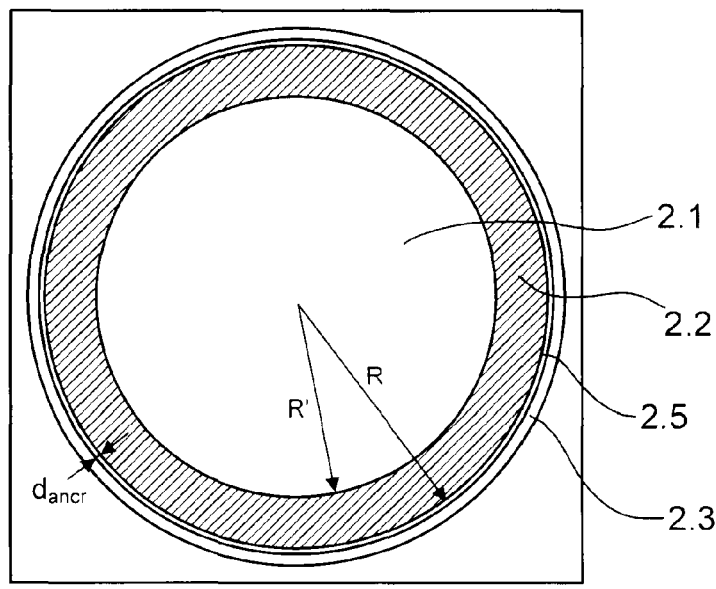
FIGS. 9A, 9B show two examples of the optical device used to expose numerical examples of the different parameters.
Figure 9B:
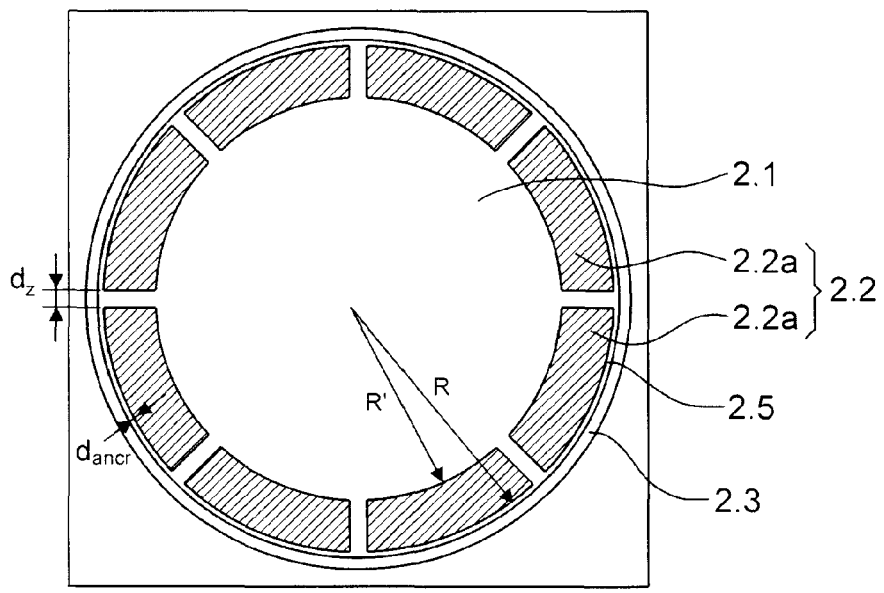

When there are several reinforced portions 2.2a, two parameters must be taken into consideration, namely the distance $d_z$ separating two consecutive reinforced portions 2.2a that succeed one another around the central area 2.1 on the one hand and the distance $d_{ancr}$ between the reinforced portions 2.2a and the anchoring area 2.3 to the support 1.5 on the other hand. The distances $d_z$ and $d_{ancr}$ are illustrated in FIGS. 9A, 9B.

The aim is that these distances $d_z$ and $d_{ancr}$ are not too great or do not apply to too flexible parts of membrane, since these parts need to withstand the pressure exercised by the actuation means 5 on the neighbouring reinforced portions 2.2a. These parts must not be too rigid either so as not to hinder the displacement of the neighbouring reinforced portions 2.2a. The aim is that they behave in a manner as close as possible to the reinforced portions 2.2a.

Such an optical device according to the invention may be manufactured by means of technologies employed in microelectronics and in microsystems. It is possible to employ both for the membrane and the actuation means techniques for depositing thin films by chemical vapour deposition (CVD), by electrodeposition, by epitaxy, by thermal oxidation, by physical vapour deposition (PVD), or instead by evaporation. The techniques of laminating films, spin coater deposition for organic or sol gel materials, moulding, hot embossing, nano printing, bonding of two substrates by direct bonding, by eutectic bonding, by anodic bonding, by organic bonding may also be used.

An example will now be described of a method for making an optical device with variable focal distance according to the invention. A sacrificial layer is going to be used. Reference is made to FIGS. 10A to 10E.

One begins with a substrate 100 in which a dish 3 has been etched. The substrate 100 may for example be made of glass. A sacrificial material 101 (FIG. 10B) is deposited in the dish 3. The sacrificial material 101 may be organic, for example a photosensitive resin, or an inorganic material such as silicon oxide.

Figure 10A:
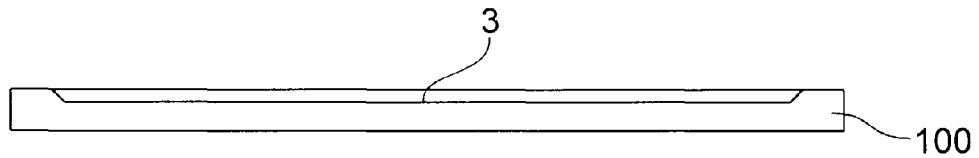
FIGS. 10A to 10E show different steps of a method for making the optical device of the invention.
Figure 10B:
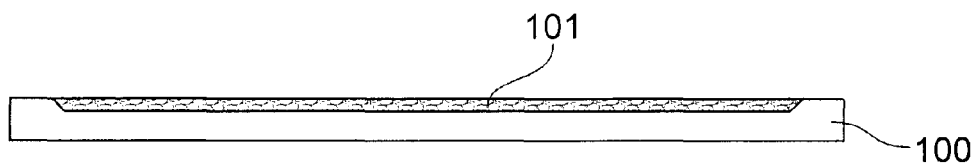
Figure 10C:
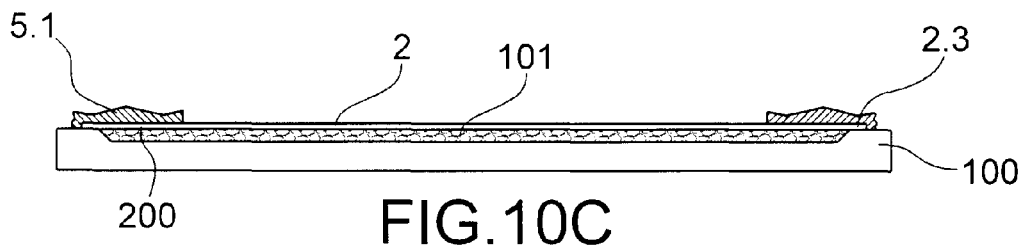
Figure 10D:
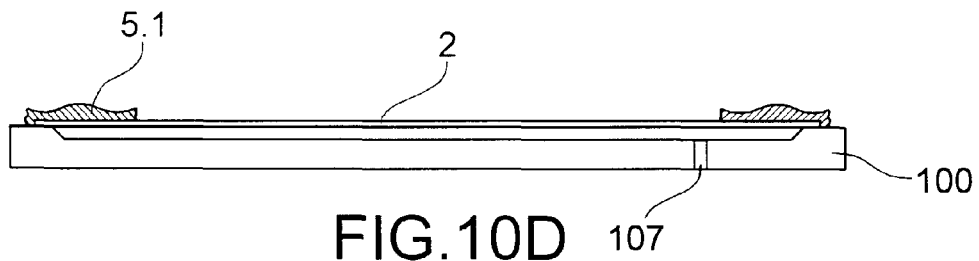
Figure 10E:
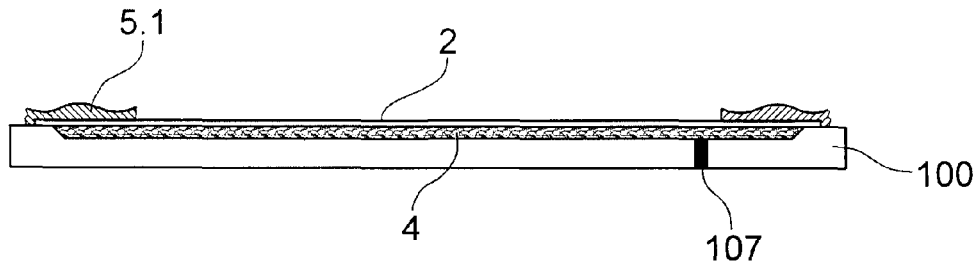

The membrane 2 is formed on the sacrificial material 101, so that it sticks out over the edge of the dish 3 and anchors to it (FIG. 10C). A material chosen among the materials enumerated above may be deposited for the membrane. The deposition may be carried out by spin coating or chemical vapour deposition. The micro-beam type actuators 5.1 are then formed so that each surmounts a stressed part 200 of the membrane 2. They are also in direct or indirect contact with the substrate 100 in an area that must not be bathed by the liquid (FIG. 10C). The membrane 2 is then freed by removing the sacrificial material 101. To do this, at least one hole 107, outside of the optical field, may be pierced in the substrate 100 until it reaches the sacrificial material 101. The hole 107 passes through and opens out into the dish 3 (FIG. 10D). The removal may be chemical or thermal or by oxygen plasma. The dish 3 is then filled with the liquid 4 (FIG. 10E). The filling can be carried out by placing the dish 3 in a vacuum to favour the penetration of the liquid 4 and avoid the formation of bubbles. Finally, the hole 107 is filled so that the liquid 4 cannot escape (FIG. 10E). An organic material may be used. The order of the steps is not limitative.

The micro-beam type actuators 5.1 could also be formed after the freeing of the membrane 2 for example, before the filling or after. It is also possible to form them on the sacrificial layer 101 and the substrate 100 before forming the membrane 2, if they have to be located on the liquid 4 side. In such a configuration, it may be that the membrane 2 surmounts totally or partially the micro-beam type actuators 5.1.

In FIG. 10, the micro-beam type actuators 5.1 are represented in contact with the substrate 100, this is not an obligation, they could not have stuck out from the membrane 2 and be confined to the anchoring area 2.3.

If it is desired that the membrane 2 at rest is bulging, concave or convex, an appropriate curvature is given to the sacrificial layer 101, since it serves as mould for the membrane 2. Another solution to obtain a bulging membrane 2 would be to buckle it after having freed it. The buckling may be thermal. The determining parameters are then the difference in thermal expansion coefficient between the membrane and the substrate and the deposition temperature of the membrane.

Figure 11:
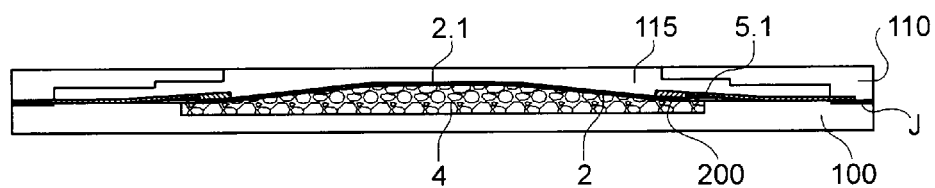
FIG. 11 shows an optical device comprising two supports assembled together.

To protect the membrane 2, it is possible that the optical device of the invention is formed by the assembly of two supports, a first support 110 supporting the micro-beam type actuators 5.1 and the second support 100 supporting the membrane 2 and the liquid 4. The first support 110 serves as mechanical protection for the optical device of the invention. A joint J of adhesive is used to assemble the two supports 100, 110. The first support 110, is hollowed out in its central part, said hollowing out 115 will correspond at least to the optical field 2.1 of the membrane 2 once the supports 100, 110 have been assembled. Reference is made to FIG. 11. In the stressed parts of 200, the micro-beam type actuators may be at rest in contact or not with the membrane. The actuators may be joined to the first support and if necessary to the second support. Such a configuration in which the method for producing the membrane is dissociated from that for producing the actuation means makes it possible to simplify, all in all, the overall process. A better production yield may in this way be envisaged.

An advantageous configuration in terms of geometry of the membrane of a variable focal distance optical device according to the invention will now be described. It is assumed that the liquid 4 lies on a flat bottom. Reference is again made to FIG. 9A. The membrane is circular, its optical field 2.1 is circular and the reinforced area 2.2 and the anchoring area 2.3 are concentric crowns.

The uniformly loaded circular plate model, anchored on its periphery and subjected to considerable deflections in relation to the thickness of the plate, is used to calculate the characteristics of the membrane, this model is presented in the work of S. Timoshenko cited above.

The maximum deflection $\omega_o$ of the optical field is given by the formula:

$$\omega_0 = \frac{Pa^4}{64D} \cdot \frac{1}{1 + 0.488 \frac{\omega_0^2}{h^2}} \text{ with } D = \frac{Eh^3}{12(1-v^2)}$$

where P is the pressure exercised on the optical field, a is the radius of the optical field, E is the Young's modulus of the material constituting the membrane in the optical field, v is the Poisson's coefficient of the material constituting the membrane in the optical field, h is the thickness of the membrane in the optical field. Knowing the maximum deflection $\omega_o$ of the central area 2.1, necessary to carry out the variation in the requisite focal distance, the maximum pressure P to be exercised by the liquid 4 on the central area 2.1 is approximately deduced from this.

In an iterative manner, by changing the material constituting the central area 2.1, the maximum pressure P required for the correct operation of the liquid lens or the mirror can be varied. Since the possible materials are numerous for the central area 2.1, as has been seen above, and the thickness h of the central area 2.1 can vary in a significant manner, the maximum pressure P required may thus be adjusted in a judicious manner, so that it is in keeping with the surface area of the reinforced area 2.2 and with the force P of the actuation means 5. The mechanical behaviour of the membrane in the central area 2.1 depends on the maximum deflection of the membrane, the force applied by the actuation means 5, their travel and the surface area of the reinforced area.

The optical field 2.1 may have a diameter of 2.5 mm, there is no guard area between the optical field 2.1 and the reinforced area 2.2, but there is an intermediate guard area 2.5 between the optical field 2.1 and the anchoring area 2.3. The width of the anchoring area 2.3 equals 200 micrometers. The reinforced area 2.2 is between an interior radius R' of 1.25 mm and an exterior radius R varying between 1.35 and 2.05 millimeters. The surface area of the reinforced area 2.2 thus varies between 0.8 and 8.3 square millimeters. It is assumed that the membrane is made of parylene, that its thickness is 1 micrometer and that the requisite maximum deflection in the central area of the optical field is 20 micrometers. The total force exercised by the actuation means along the z axis varies between 0.2 and 0.4 mN. From this force, those skilled in the art will have no difficulty in determining the energy to apply to the micro-beam type actuators.

The travel of the reinforced area 2.2 varies between 3 micrometers for a surface area of 8.3 mm² and 7 micrometers for a surface area of 0.8 mm². The width $d_{ancr}$ of the intermediate guard area 2.5 may for example extend up to 0.2 mm.

By taking all of the approximations made and by refining the dimensioning, either experimentally or by mechanical and optical simulations, it is probable that the forces and travel could be reduced, which will simplify the dimensioning of the actuation means and make the optical device even more compact.

Another numerical example is described below. Reference is made to FIG. 9B. The only difference with FIG. 9A is that now, provision is made for a reinforced area 2.2 split up into several reinforced portions 2.2a, which are in fact eight sectors of circular crown arranged around the central area 2.1. The different sectors of circular crown are spaced apart by a distance $d_z$ equal to several tens to several hundreds of micrometers. The surface area of the reinforced area 2.2 is expressed by:

$$\pi(R^2 - 1.25^2) - 8d_z(R - 1.25)$$

The distance $d_z$ must not hinder the correct operation of the variation in the focal distance.

A compromise has to be made between the number of reinforced portions 2.2a and their surface areas and thus the number and the size of the micro-beam type actuators. The choice of the number of reinforced portions 2.2a also depends on the capacity of the actuation means to actuate in a substantially identical manner each of the reinforced portions 2.2a and the nature of the strain exercised by the actuation means.

It may be that optical aberrations appear with an optical device according to the invention. They are linked to the lack of parallelism between the edge of the deformed membrane 2 and the support 1.5 in the anchoring. They can in particular appear when the optical device of the invention is formed from two substrates assembled as described in FIG. 11. They result in a maximum deflection $\omega_o$, which is no longer at the centre of the optical field 2.1. The optical axis of the optical device passes through the centre of the optical field 2.1. The quality of the images is deteriorated.

To limit such a phenomenon in conventional liquid lenses, it was aimed to optimise the assembly of the membrane to the support, this assembly was based on sealing techniques so that at rest the requisite parallelism is obtained. But then when the lens is working, it may be necessary to vary its focal distance by means of a supply voltage V0 used to actuate the actuation means 5. If the displacement induced by the actuation means 5 is not uniform over the whole periphery of the liquid lens, the phenomenon appears and the quality of the image is degraded. The space d between the bottom 3.1 of the dish 3 and the stressed part 200 of the membrane 2 is not constant over the whole periphery of the membrane. This anomaly can also occur in an optical device according to the invention if nothing is done during the command of the actuation means 5. Indeed, the different micro-beam type actuators 5.1 may not be supplied with exactly the same voltage V0. A drift in the course of certain actuators 5 may occur. The pressure of the liquid 4 may not be completely uniform over the whole periphery of the membrane, this can happen if the device is employed slightly leaning to one side. In operation, the phenomenon is thus difficult to control and strongly penalises this type of optical device. In order to combat this effect, it is possible to provide for a control of the command of the actuation means 5.

Figure 12:
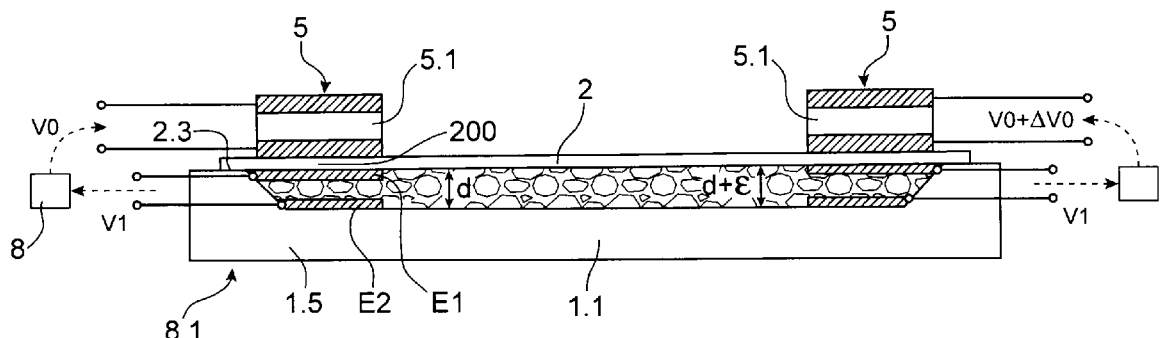
FIG. 12 shows an optical device according to the invention equipped with capacitive means for measuring the thickness of the liquid and means for automatically controlling the actuation means as a function of the thickness of the liquid.

Reference is made to FIG. 12. The variation in the focal distance of the optical device is always obtained by means of the action of the micro-beam type actuators 5.1 when they are actuated, by application of a supply voltage V0 aiming to generate a mechanical deformation of the micro-beams. In addition, means 8 for automatically controlling the voltage to be applied to the actuation means 5 are provided for as a function of the thickness d of the liquid in the stressed part 200. The automatic control means 8 cooperate with capacitive means 8.1 for measuring the thickness of the liquid, arranged in several places preferably in the stressed parts 200. The measuring means 8.1 may comprise several pairs of electrodes distributed in the stressed parts 2.2. The first electrode of a pair E1 is situated in contact with the membrane 2 on the liquid 4 side and the second electrode E2 is located at the bottom of the dish facing the first electrode E1 of the pair of electrodes. By applying a potential difference V1 to the two electrodes E1, E2 of each pair of electrodes and by measuring the capacity on each pair of electrodes E1, E2, the quantity of liquid 4 located between the electrodes E1, E2 is acquired in each of the pairs of electrodes E1, E2 and thus the thickness of liquid between the membrane 2 and the bottom 3.1 of the dish 3.

In FIG. 12, only the automatic control means 8 have been schematised, in addition they are only seen for two pairs of electrodes E1, E2 and two actuators 5.1 so as not to overburden the figure.

During the operation of the optical device object of the invention, if capacitive measurements are obtained that differ from one place to another, for example d, d+$\epsilon$, the automatic control means 8 receive the capacitive measurements from the measuring means 8.1, compare them to a reference value that here corresponds to the spacing d otherwise measured, and command that a supplementary correction voltage $\Delta V0$, in addition to the reference voltage V0, is applied to the corresponding actuators 5.1, at the places where the capacitive measurement differs from the reference value. Thus, all of the capacitive measurements are equalised to the reference value and thus all of the distances between the membrane 2 and the bottom 3.1 of the dish 3, by adjusting the supply voltages of the actuators 5.1.

The parallelism necessary for the correct operation of the lens or the mirror is thus ensured by an automatic displacement control. Said automatic control does not pose any problem for those skilled in the art.

When it is wished to vary the focal distance of the optical device, a voltage V0 is applied to all of the actuators 5.1 of the actuation means as represented in FIG. 12, by means of measuring means 8.1, the space d between the membrane 2 and the bottom 3.1 of the dish 3 is measured, the measurements are delivered to the automatic control means 8. If one or more pairs of electrodes E1, E2 detect a parasitic shift $\epsilon$, the automatic control means 8 command the application of the additional correction voltage $\Delta V0$ to one or more actuators 5 the closest to the pairs of electrodes having detected the parasitic shift E. The additional correction voltage $\Delta V0$ applied to one or more actuators 5.1 ensures that they displace locally the membrane 2 so that the shift $\epsilon$ is cancelled.

The number of pairs of electrodes E1, E2 is a function of the number of actuators 5.1 and the surface area and the rigidity of the reinforced area if it exists. The position of the pairs of electrodes E1, E2 also needs to be optimised as a function of the parts 200 stressed by the actuators 5.1. Since the objective is to be able to compensate the shifts noticed by the pairs of electrodes, it appears opportune to place a pair of electrodes at each actuator 5.1 and thus in each stressed part. It would obviously be conceivable to place the pairs of electrodes between the stressed parts 200 but the automatic control would be more difficult to form.

The surface area of the electrodes E1, E2 is directly linked to the thickness of the liquid 4 at rest and the higher the thickness of the liquid 4, the greater the surface area of the electrodes E1, E2.

Concerning their dimensioning, it is also necessary to integrate the precision necessary for the correct operation of the optical device. Indeed, the capacity C of the flat capacitor formed by the opposing electrodes E1, E2 is expressed by $C=\epsilon'S'/e$ where S' is the surface area of the electrodes, e the thickness of the liquid and $\epsilon'$ the permittivity of the liquid. The charge of the capacitor Q is expressed as $Q=CV'$ where V' is the potential difference applied to the electrodes of the capacitor. It ensues that $Q=\epsilon'S'V'/e$. For given V and $\epsilon'$, the larger is S' and the smaller is e, the larger is Q and thus the more sensitive the electrodes E1, E2. Given the performances targeted for the optical device, a maximum shift max between the electrodes may be tolerated without having an impact on the quality of the image. The measurement precision of the pairs of electrodes must be less than max.

For the targeted applications of autofocus and zoom, the focal distance of the optical device has to be modified with great rapidity, in other words high frequency in order to ensure a response time as short as possible. In a still camera or film camera application, for several distances that the optical device takes during a variation in the focal distance, the image sensor that is present will be used to carry out an image test until the requisite focal distance is found. In such dynamic operation, the capacitive measurements are taken several times for a given focal distance. Indeed, several cycles of acquisition of capacitive measurements, comparison with a reference value, processing of data and command of actuators are necessary for each focal distance value in order to ensure the requisite optical quality. It is therefore necessary that the acquisition frequency of the capacitive measurements is considerably greater than the frequency of variation in the focal distance.

The entire part of processing of the signal associated with this control of the displacement by capacitive measurements needs to be optimised in order to reduce the response time of the liquid lens while at the same time ensuring a uniformity of displacement, within the acceptable limit for optical performances. This does not pose any problem to those skilled in the art.

The variation in the focal distance is controlled by the force delivered by the actuation means 5 but is controlled in displacement by means of the automatic control means 8. Such control of the displacement and thus the deformation of the membrane 2 makes it possible to improve considerably the optical quality of the optical device.

The undesirable effects of the orientation of use of the optical device of the invention are eliminated by two factors: firstly, limiting the volume of liquid 4, and thus minimising the weight of liquid 4 and, secondly, controlling the displacement of the membrane 2 by means of the capacitive measurement.

Other embodiments of the liquid lens type optical device object of the invention type will now be considered. Reference is made to FIGS. 13A to 13E.

In FIG. 13A, the support 1.5 of the membrane 2 is now formed of a frame 1 joined to a plate 1.1 to form the dish 3. The plate 1.1 materialises the bottom of the dish 3, it is transparent. There is no modification to the membrane 2 or the liquid 4 compared to that which has been described previously. The actuation means are not represented so as not to overburden the figure.

The transparent plate 1.1 may be of substantially constant thickness, with substantially parallel flat faces, as in FIG. 13A. At least one face could be structured as in FIGS. 13B, 13C, 13D, where the exterior face is convex or concave. The choice is made as a function of the requisite optical performances. It lets pass an optical radiation, which traverses the lens. The frame 1 may be made of semi-conductor material such as silicon, which makes it able to integrate the circuits associated with the processing of the command of the actuation means, especially if an automatic control is provided for. The circuits are not represented so as not to overburden the figures. The transparent plate 1.1 may be made of glass or plastic material.

Figure 13B:
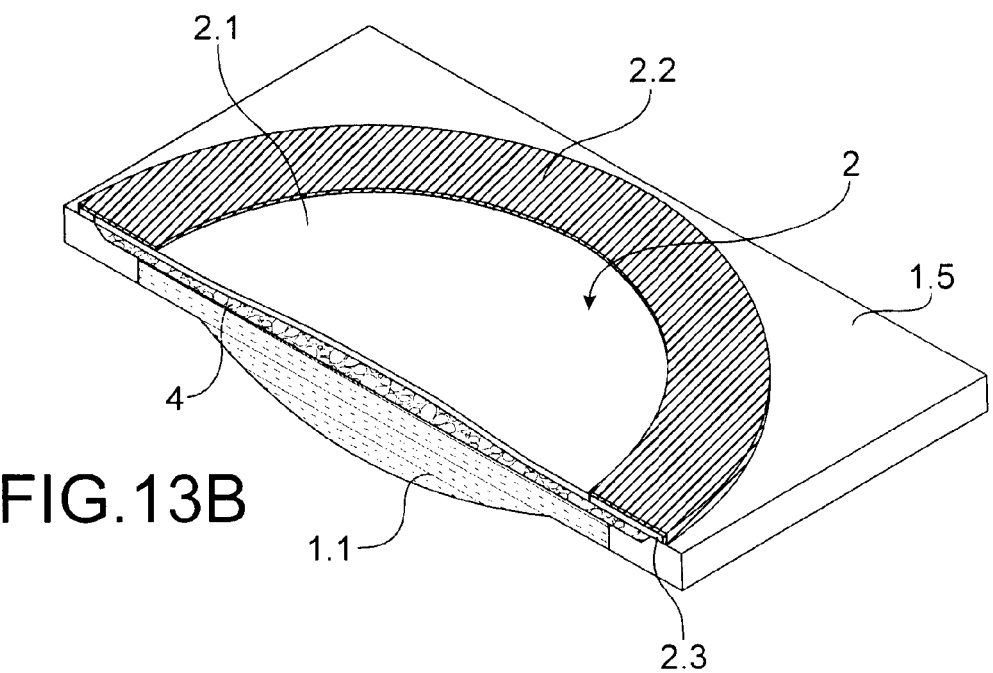
Figure 13C:
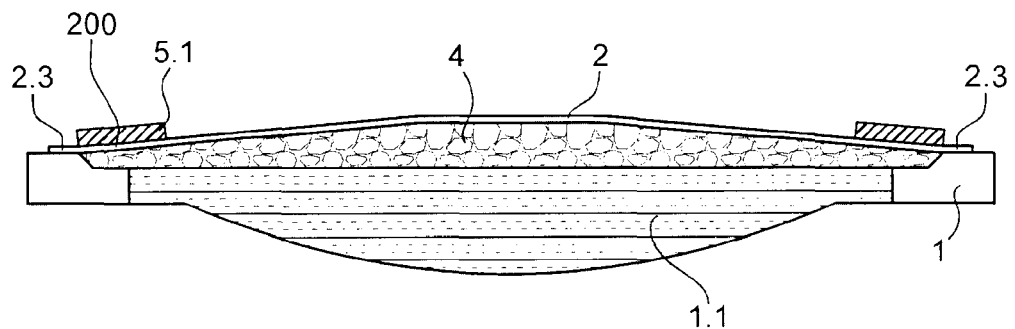
Figure 13D:
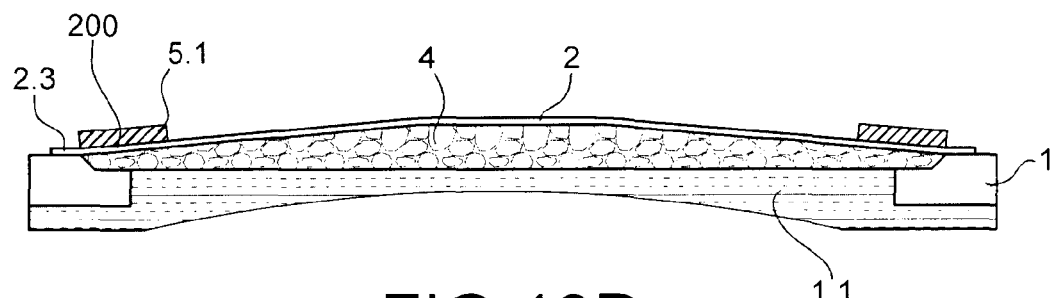

In FIGS. 13B, 13C, the transparent plate 1.1 is of convex structure and in FIG. 13D it is of concave structure. The structuring of the transparent plate 1.1 may be obtained by machining or moulding for example.

Figure 13E:
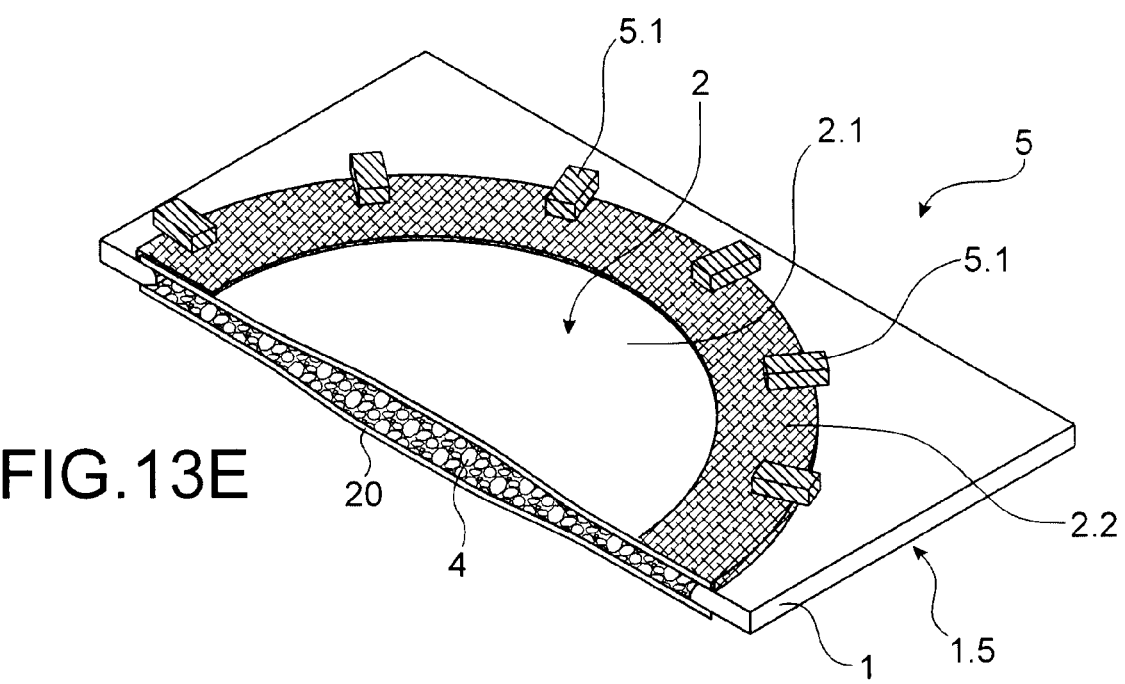

In FIG. 13E, the support 1.5 is materialised by the frame 1 and the transparent plate 1.1 is replaced by a second membrane 20. The second membrane comprises a layer that extends over the whole surface of the membrane. The two membranes 2, 20 are anchored on the frame 1, each on one of its principal faces. They help to form a housing for the liquid 4. This makes it possible to enhance the optical performances of the membrane. The actuation means 5 are provided for on only one of the membranes 2. The three areas of the membrane 2 provided with actuation means 5 are represented. The other membrane 20 is not actuated, but it nevertheless deforms when the actuation means 5 are actuated.

Such a variable focal distance optical device is much simpler than those existing, particularly when it only comprises a single membrane. In addition to the advantages of simplicity, production compactness and cost, the reliability of the whole is thereby optimised because the risk of leaks is limited.

The scale at which the optical device object of the invention is formed may be much smaller than that at which traditional liquid lenses are formed. Since production on wafer techniques are precise and repeatable, the quantities of liquid may thus be reduced, of the order of several hundredths of mm³ to several mm³. This advantage makes it possible to avoid two conventional problems, which are the effect of variations in temperature and pressure on the working of the optical device and its impact resistance. Indeed, by minimising the amount of liquid, in a constant volume lens, the phenomena of expansion of said liquid under the effect of variations in temperature and pressure are limited.

Furthermore, the lower the volume of liquid, the better the impact resistance of the optical device. Indeed, the mass of liquid is less and stresses the membrane less in the case of impacts.

Figure 14A:
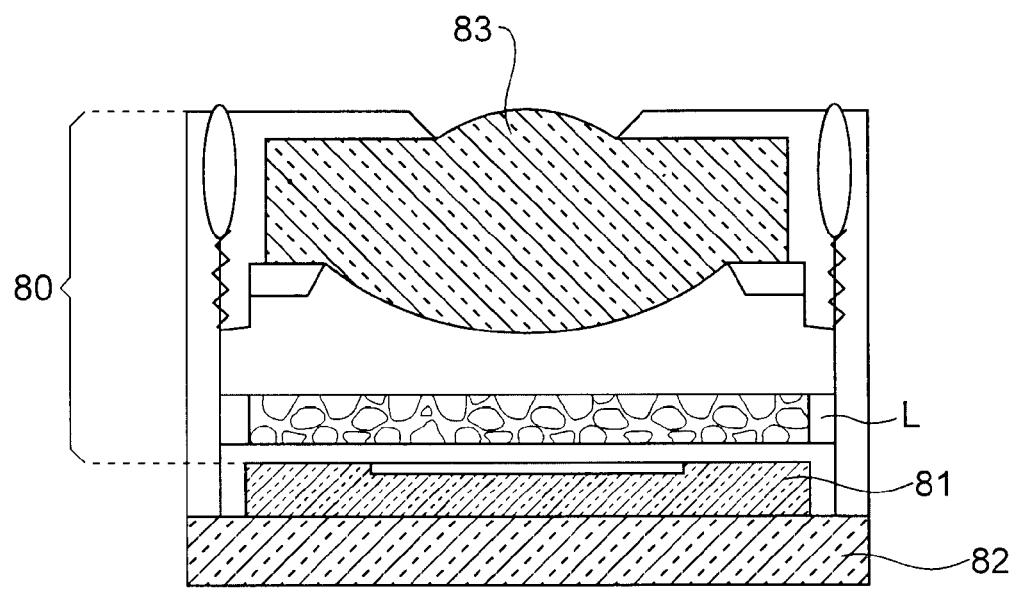
FIGS. 14A, 14B show two camera devices employing at least one optical device of the invention FIGS. 15A, 15B already described, show liquid lenses of the prior art.

Such an optical device with variable focal distance may be employed in a camera device, particularly that of a portable telephone still camera. Reference is made to FIG. 14A. Such a camera device comprises, in cascade, an objective 80 including at least one optical device with variable focal distance L according to the invention of liquid lens type, an image sensor 81 for example of CCD or CMOS type borne by a substrate 82. In the example described, the objective 80 comprises at least one lens 83 with fixed focal distance and a liquid lens L according to the invention. Hereafter, this lens with fixed focal distance 83 will be known as conventional optical set. The liquid lens L is located between the conventional optical set 83 and the image sensor 81. In an alternative, the conventional optical set 83 may be located between the liquid lens L and the image sensor 81. The conventional optical set 83 is static. As has been seen previously, by virtue of its method of production, the liquid lens L may be compared to a MOEMS (microoptoelectromechanical system). The liquid lens L with variable focal distance is placed at a certain distance, which depends on the characteristics of the objective 80, the image sensor 81, but if this distance is small, the liquid lens L and the image sensor 81 could form only a single component by integrating them either in AIC (Above Integrated Circuit) technology, or in WLCSP (Wafer Level Chip Scale Package) technology. The focal distance of the liquid lens L is adapted by optimising the pressure of the liquid at rest, but also the curvature of the membrane at rest and the refractive index of the liquid.

Figure 14B:
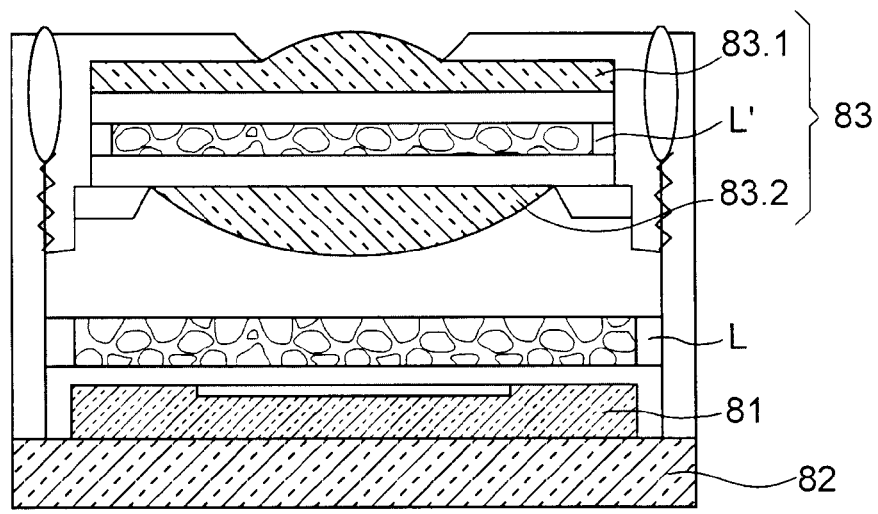
Figure 15A:
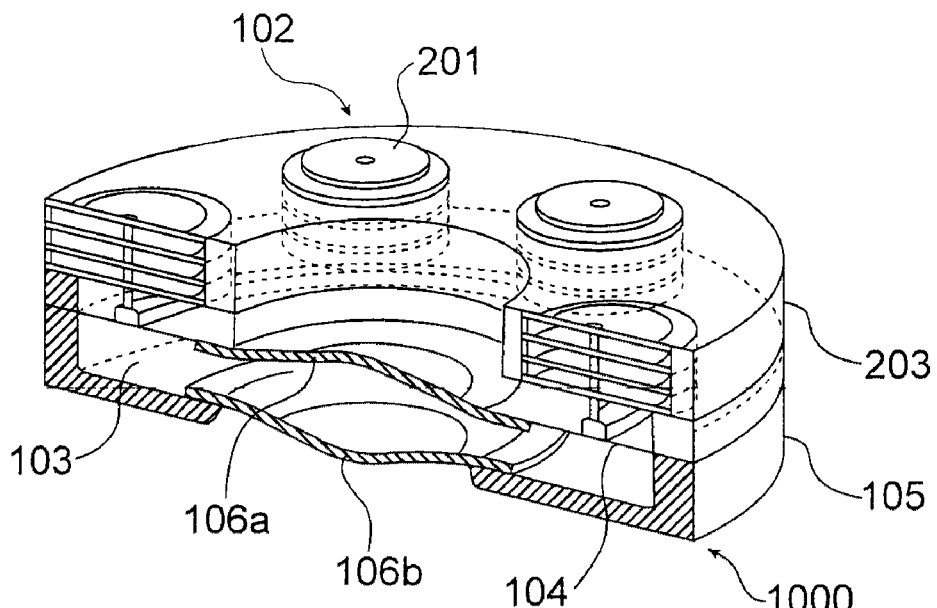
Figure 15B:
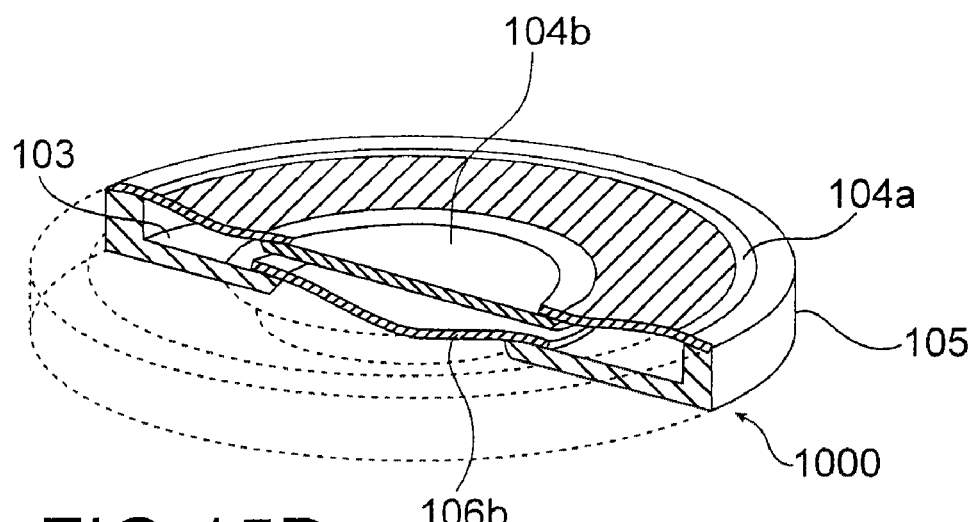

If the camera device also includes the zoom function as in FIG. 14B, an optical set 83 will be used with at least two lenses with fixed focal distance 83.1 83.2 and two liquid lenses L and L', one of which is located between the two lenses 83.1, 83.2 of the optical set 83 and the other near to the image sensor 81 as in FIG. 14B.

Although several embodiments of the present invention have been described in a detailed manner, it will be understood that different changes and modifications may be made without going beyond the scope of the invention and in particular many other methods may be used to form the membrane and the actuation means.

The invention claimed is:

1. An optical device with deformable membrane comprising:
   an anchoring area on a support helping to contain a constant volume of liquid in contact with a face of the support;
   a substantially central area, configured to be deformed reversibly from a rest position; and
   actuation means for displacing the liquid in the central area, stressing the membrane in parts situated between the central area and the anchoring area,
   wherein the actuation means comprises plural micro-beam thermal or piezoelectric actuators, distributed at a periphery of the membrane, the micro-beam thermal or piezoelectric actuators including at least one part joined to the support that is fixed on an actuation and at least one moving part coming into contact, on an actuation, with the membrane in an area situated between the central area and the anchoring area.

2. An optical device according to claim 1, wherein the moving part is without contact with the parts of the membrane stressed by the actuation means at the rest position.

3. An optical device according to claim 1, wherein the moving part is in contact with the parts of the membrane that are stressed by the actuation means.

4. An optical device according to claim 1, wherein the micro-beam thermal or piezoelectric actuators are joined to the support in an indirect manner.

5. An optical device according to claim 1, wherein the micro-beam thermal or piezoelectric actuators are joined to the support by the membrane in the anchoring area.

6. An optical device according to claim 1, wherein the micro-beam thermal or piezoelectric actuators are joined to the support beyond the membrane.

7. An optical device according to claim 1, wherein the micro-beam thermal or piezoelectric actuators are in contact with the liquid.

8. An optical device according to claim 1, wherein the membrane is integrated in the micro-beam thermal or piezoelectric actuators.

9. An optical device according to claim 1, wherein the micro-beam thermal or piezoelectric actuators are between two layers of the membrane.

10. An optical device according to claim 1, wherein the micro-beam thermal or piezoelectric actuators work in flexion.

11. An optical device according to claim 1, wherein the membrane comprises at least one continuous layer occupying a whole surface of the membrane.

12. An optical device according to claim 1, wherein the parts of the membrane stressed by the actuation means are included in a reinforced area of the membrane, situated between the central area and the anchoring area, surrounding the central area, the reinforced area having a rigidity greater than that of the central area and that of the anchoring area.

13. An optical device according to claim 12, wherein the reinforced area extends up to the central area without encroaching upon the central area or stopping before the central area.

14. An optical device according to claim 12, wherein the reinforced area extends up to the anchoring area without encroaching upon the anchoring area or stopping before the anchoring area.

15. An optical device according to claim 12, wherein the membrane comprises at least one continuous layer occupying a whole surface of the membrane, and the reinforced area comprises the at least one continuous layer.

16. An optical device according to claim 12, wherein the membrane comprises at least one continuous layer occupying a whole surface of the membrane, and the reinforced area comprises a stack of at least the at least one continuous layer and an additional layer.

17. An optical device according to claim 16, wherein an intermediate guard area is laid out between the anchoring area and the reinforced area, between the reinforced area and the central area or between the anchoring area, the reinforced area, and the central area, and the intermediate guard area comprising comprises the at least one continuous layer.

18. An optical device according to claim 12, wherein the membrane comprises at least one continuous layer occupying a whole surface of the membrane, and the anchoring area comprises the at least one continuous layer.

19. An optical device according to claim 12, wherein a surface area of the parts of the membrane stressed by the actuation means is less than that of the reinforced area.

20. An optical device according to claim 12, wherein the reinforced area includes plural discrete reinforced portions, each of the of the reinforced portions surrounding the central area.

21. An optical device according to claim 20, wherein when the reinforced portions form a discontinuous crown around the central area, and the membrane further comprises a continuous reinforcement area surrounding the central area, more rigid than the reinforced portions, situated between the central area and the reinforced portions.

22. An optical device according to claim 12, wherein the reinforced area comprises a single part.

23. An optical device according to claim 22, wherein the reinforced area is a crown or a plurality of portions of crown provided with radial fingers projecting towards the central area or towards the anchoring area.

24. An optical device according to claim 1, wherein the support is substantially flat.

25. An optical device according to claim 1, wherein the support comprises two substrates assembled together, the membrane being joined to one of the two substrates, and the micro-beam thermal or piezoelectric actuators are joined to another of the two substrates.

26. An optical device according to claim 1, wherein the support comprises a frame and a second membrane anchored on the frame.

27. An optical device according to claim 1, wherein the support comprises a frame and a transparent plate fixed to the frame helping to form a dish for the liquid, the transparent plate having substantially flat and parallel faces or one face external to the dish substantially concave or one face external to the dish substantially convex.

28. An optical device according to claim 1, further comprising capacitive means for measuring a thickness of the liquid provided in at least one part of the membrane stressed by the actuation means.

29. An optical device according to claim 28, further comprising means for automatically controlling the actuation means as a function of the thickness of liquid measured by the capacitive means for measuring.

30. An optical device according to claim 1, wherein the membrane is made from organic based materials or polydimethylsiloxane, polymethyl methacrylate, polyethylene terephthalate, polycarbonate, parylene, epoxy resins or inorganic minerals.

31. An optical device according to claim 1, wherein the liquid is propylene carbonate, water, an index liquid, an optical oil or an ionic liquid.

32. An optical device according to claim 1, wherein the optical device is a liquid lens or a mirror.

33. A camera device comprising at least one optical device according to claim 1.

34. An optical device according to claim 1, wherein the moving part is joined to the parts of the membrane stressed by the actuation means.

35. An optical device according to claim 1, wherein the micro-beam thermal or piezoelectric actuators are without contact with the liquid.

36. An optical device according to claim 1, wherein the membrane is made from silicon, silicon oxide, silicon nitride, silicon carbide, polycrystalline silicon, titanium nitride, diamond carbon, tin and indium oxide, or aluminum.

37. An optical device according to claim 1, wherein the support includes a dish to accommodate the liquid.

38. An optical device with deformable membrane comprising:
   an anchoring area on a support helping to contain a constant volume of liquid in contact with a face of the support;
   a substantially central area, configured to be deformed reversibly from a rest position; and
   an actuator configured to displace the liquid in the central area, stressing the membrane in parts situated between the central area and the anchoring area,
   wherein the actuator comprises plural micro-beam thermal or piezoelectric actuators, distributed at a periphery of the membrane, the micro-beam thermal or piezoelectric actuators including at least one part joined to the support that is fixed on an actuation and at least one moving part coming into contact, on an actuation, with the membrane in an area situated between the central area and the anchoring area.

* * * * *